United States Patent
Jain et al.

(10) Patent No.: US 7,185,034 B2
(45) Date of Patent: Feb. 27, 2007

(54) BUFFERED MESSAGE QUEUE ARCHITECTURE FOR DATABASE MANAGEMENT SYSTEMS WITH GUARANTEED AT LEAST ONCE DELIVERY

(75) Inventors: Namit Jain, Emeryville, CA (US); Neerja Bhatt, Mountain View, CA (US); Kapil Surlaker, Mountain View, CA (US); Krishnan Meiyyappan, Fremont, CA (US); Shailendra Mishra, Fremont, CA (US); Bhagat Nainani, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 395 days.

(21) Appl. No.: 10/443,323

(22) Filed: May 21, 2003

(65) Prior Publication Data

US 2004/0034640 A1 Feb. 19, 2004

Related U.S. Application Data

(60) Provisional application No. 60/410,883, filed on Sep. 13, 2002, provisional application No. 60/400,532, filed on Aug. 1, 2002.

(51) Int. Cl.
*G06F 17/30* (2006.01)
(52) U.S. Cl. ...................... 707/206; 707/200
(58) Field of Classification Search ............... 707/102, 707/203, 100, 101, 103 R, 104.1, 200, 206, 707/1; 719/314; 714/2; 709/206, 207
See application file for complete search history.

(56) References Cited

U.S. PATENT DOCUMENTS 4,318,182 A 3/1982 Bachman et al.
5,113,522 A 5/1992 Dinwiddie et al.

(Continued)

OTHER PUBLICATIONS

Current Claims in PCT application, International Application No. PCT/US03/23747, 14 pages.

(Continued)

*Primary Examiner*—Frantz Coby
(74) *Attorney, Agent, or Firm*—Hickman Palermo Truong & Becker LLP; Edward A. Becker

(57) ABSTRACT

A buffered message queue architecture for managing messages in a database management system is disclosed. A "buffered message queue" refers to a message queue implemented in a volatile memory, such as a RAM. The volatile memory may be a shared volatile memory that is accessible by a plurality of processes. The buffered message queue architecture supports a publish and subscribe communication mechanism, where the message producers and message consumers may be decoupled from and independent of each other. The buffered message queue architecture provides all the functionality of a persistent publish-subscriber messaging system, without ever having to store the messages in persistent storage. The buffered message queue architecture provides better performance and scalability since no persistent operations are needed and no UNDO/REDO logs need to be maintained. Messages published to the buffered message queue are delivered to all eligible subscribers at least once, even in the event of failures, as long as the application is "repeatable." The buffered message queue architecture also includes management mechanisms for performing buffered message queue cleanup and also for providing unlimited size buffered message queues when limited amounts of shared memory are available. The architecture also includes "zero copy" buffered message queues and provides for transaction-based enqueue of messages.

30 Claims, 15 Drawing Sheets

U.S. PATENT DOCUMENTS

| | | | |
|---|---|---|---|
| 5,222,217 A | 6/1993 | Blount et al. | |
| 5,347,632 A * | 9/1994 | Filepp et al. | 709/202 |
| 5,357,612 A | 10/1994 | Alaiwan | |
| 5,465,328 A | 11/1995 | Dievendorff et al. | |
| 5,546,570 A * | 8/1996 | McPherson et al. | 707/4 |
| 5,627,764 A | 5/1997 | Schutzman et al. | |
| 5,790,807 A | 8/1998 | Fishler et al. | |
| 5,802,253 A | 9/1998 | Gross et al. | |
| 5,828,835 A | 10/1998 | Isfeld et al. | |
| 5,867,665 A * | 2/1999 | Butman et al. | 709/239 |
| 5,867,667 A * | 2/1999 | Butman et al. | 709/249 |
| 5,870,562 A * | 2/1999 | Butman et al. | 709/238 |
| 5,878,056 A | 3/1999 | Black et al. | |
| 5,884,035 A * | 3/1999 | Butman et al. | 709/218 |
| 5,940,839 A | 8/1999 | Chen et al. | |
| 6,026,430 A * | 2/2000 | Butman et al. | 709/203 |
| 6,029,205 A | 2/2000 | Alferness et al. | |
| 6,058,389 A | 5/2000 | Chandra et al. | |
| 6,182,086 B1 | 1/2001 | Lomet et al. | |
| 6,188,699 B1 | 2/2001 | Lang et al. | |
| 6,334,114 B1 | 12/2001 | Jacobs et al. | |
| 6,338,074 B1 * | 1/2002 | Poindexter et al. | 715/500 |
| 6,393,423 B1 | 5/2002 | Goedken | |
| 6,442,568 B1 | 8/2002 | Velasco et al. | |
| 6,473,794 B1 * | 10/2002 | Guheen et al. | 709/223 |
| 6,480,500 B1 * | 11/2002 | Erimli et al. | 370/412 |
| 6,493,826 B1 | 12/2002 | Schofield et al. | |
| 6,515,968 B1 * | 2/2003 | Combar et al. | 370/252 |
| 6,519,571 B1 * | 2/2003 | Guheen et al. | 705/14 |
| 6,529,932 B1 | 3/2003 | Dadiomov et al. | |
| 6,536,037 B1 * | 3/2003 | Barrese et al. | 717/151 |
| 6,622,057 B1 * | 9/2003 | Ko et al. | 700/113 |
| 6,654,907 B2 * | 11/2003 | Stanfill et al. | 714/16 |
| 6,658,596 B1 | 12/2003 | Owen et al. | |
| 6,691,155 B2 | 2/2004 | Gottfried | |
| 6,826,182 B1 * | 11/2004 | Parthasarathy | 370/390 |
| 7,068,775 B1 * | 6/2006 | Lee | 379/265.02 |
| 7,092,975 B2 * | 8/2006 | Bradley et al. | 707/204 |
| 2001/0047270 A1 | 11/2001 | Gusick et al. | |
| 2002/0112008 A1 | 8/2002 | Christenson et al. | |
| 2002/0138582 A1 | 9/2002 | Chandra et al. | |
| 2002/0144010 A1 | 10/2002 | Younis et al. | |
| 2003/0110085 A1 * | 6/2003 | Murren et al. | 705/26 |
| 2003/0177187 A1 * | 9/2003 | Levine et al. | 709/205 |
| 2003/0212657 A1 | 11/2003 | Kaluskar et al. | |
| 2003/0212670 A1 | 11/2003 | Yalamanchi et al. | |
| 2003/0212834 A1 * | 11/2003 | Potter et al. | 709/318 |
| 2003/0236834 A1 | 12/2003 | Gottfried | |
| 2004/0024771 A1 * | 2/2004 | Jain et al. | 707/100 |
| 2004/0024774 A1 * | 2/2004 | Jain et al. | 707/102 |
| 2004/0024794 A1 * | 2/2004 | Jain et al. | 707/201 |
| 2004/0034640 A1 * | 2/2004 | Jain et al. | 707/10 |
| 2004/0034664 A1 * | 2/2004 | Jain et al. | 707/104.1 |
| 2004/0107125 A1 * | 6/2004 | Guheen et al. | 705/7 |
| 2005/0198207 A1 * | 9/2005 | Hoblit | 709/219 |

OTHER PUBLICATIONS

International Searching Authority, "Notification of Transmittal of the International Search Report or the Declaration," dated May 25, 2004, 6 pages.

Kei Kurakawa et al., "Life Cycle Design Support Based on Environmental Information Sharing," IEEE, Feb. 1-3, 1999, Proceedings EcoDesign '99, First International Symposium, pp. 138-142.

Oliver Gunther, et al., "MMM: A Web-Based System for Sharing Statistical Computing Modules," IEEE, May-Jun. 1997, vol. 1, Issue 3, pp. 59-68.

* cited by examiner

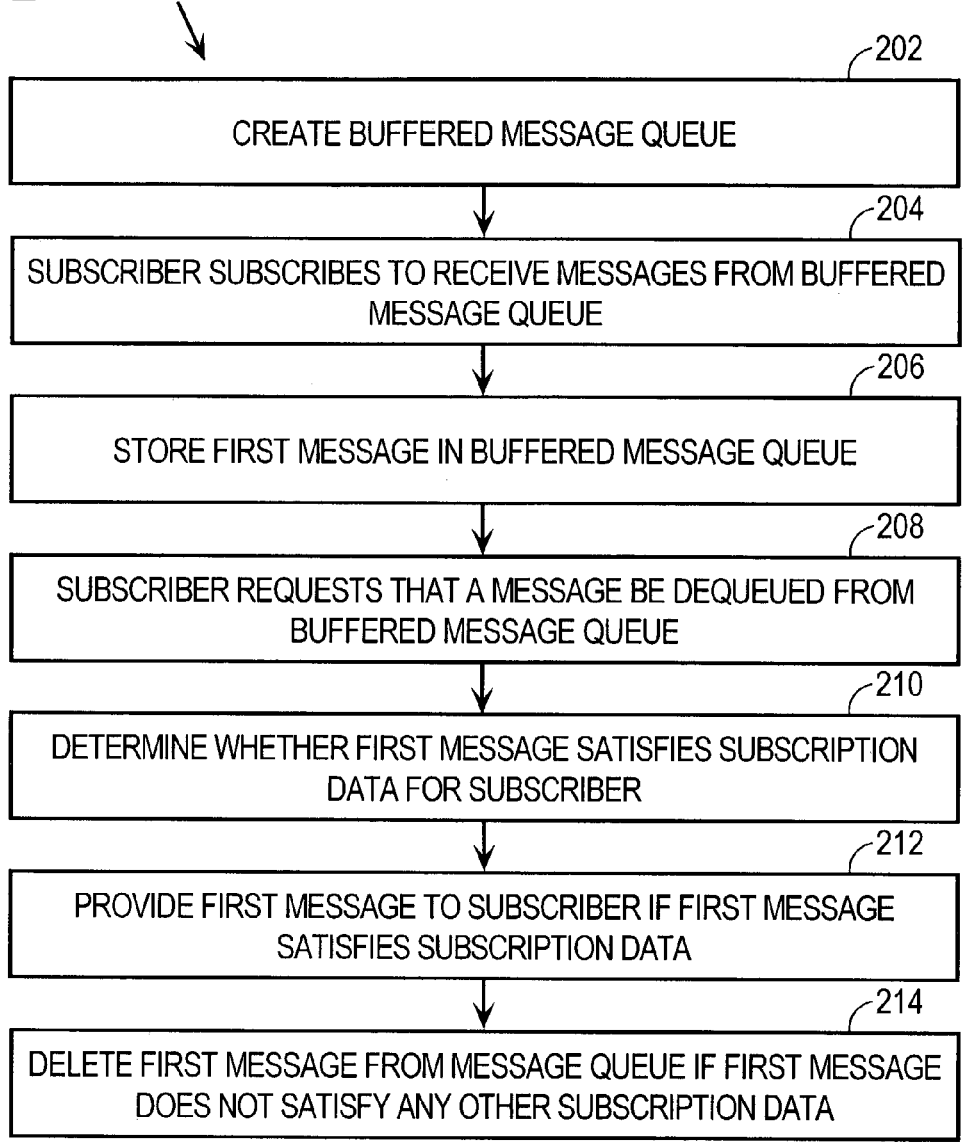

BUFFERED MESSAGE QUEUE ARCHITECTURE FOR DATABASE MANAGEMENT SYSTEMS WITH GUARANTEED AT LEAST ONCE DELIVERY

RELATED APPLICATION AND CLAIM OF PRIORITY

This application is related to and claims benefit of U.S. Provisional Patent Application No. 60/400,532 filed on Aug. 1, 2002, and this application is also related to and claims benefit of U.S. Provisional Patent Application No. 60/410,883 filed on Sep. 13, 2002. The entire contents of these prior and related applications are hereby incorporated by reference in their entirety for all purposes. This application is also related to U.S. Non provisional application Ser. No. 10/443,206 entitled "BUFFERED MESSAGE QUEUE ARCHITECTURE FOR DATABASE MANAGEMENT SYSTEMS", filed on May 21, 2003. This application is also related to U.S. Non Provisional patent application Ser. No. 10/443,175 entitled "BUFFERED MESSAGE QUEUE ARCHITECTURE FOR DATABASE MANAGEMENT SYSTEMS WITH UNLIMITED BUFFERED MESSAGE QUEUE WITH LIMITED SHARED MEMORY", filed on May 21, 2003. This application is also related to U.S. Non Provisional patent application Ser. No. 10/443,207 entitled "BUFFERED MESSAGE QUEUE ARCHITECTURE FOR DATABASE MANAGEMENT SYSTEMS WITH MEMORY OPTIMIZATIONS AND "ZERO COPY" BUFFERED MESSAGE QUEUE", filed on May 21, 2003. This application is also related to U.S. Non Provisional patent application Ser. No. 10/443,174 entitled "BUFFERED MESSAGE QUEUE ARCHITECTURE FOR DATABASE MANAGEMENT SYSTEMS WITH TRANSACTIONAL ENQUEUE SUPPORT", filed on May 21, 2003.

FIELD OF THE INVENTION

This invention relates generally to information management systems and, more specifically, to an approach for implementing message queues in database systems.

BACKGROUND OF THE INVENTION

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

Messaging is a communication model that is used to handle the complexity of communications between multiple nodes in a distributing environment or a "directed network." In the context of database management systems (DBMSs), the term "message" may refer to any type of data. For example, a database application may submit a request for data in the form of a query to a database server and the request is stored in a message queue in the DBMS. Messages can be stored persistently, propagated between queues on different machines and database, and transmitted over a network. Publish subscriber and point-to-point communication modes are supported. The database server retrieves the request from the message queue and processes the request against the database. The database server stores results of processing the request in the message queue and the database application retrieves the results from the message queue. In this example, both the request and the results may be stored as messages in the message queue of the DBMS.

In DBMS environments, data contained in message queues, i.e., messages, is sometimes stored in persistent database tables, which provides the benefits of high availability, scalability and reliability. For example, in the event of a failure, a message queue can be recovered using the particular recovery mechanism used in the DBMS to recover database tables. For example, a prior version of a database table and REDO records may be used to construct a later version of the database table. Storing DBMS message queues in persistent database tables has the disadvantage of high overhead associated with maintaining the persistent database tables. For example, recovery mechanisms require the creation and management of UNDO and REDO data for the database tables containing the message queue data. The overhead attributable to maintaining message queue data in database tables can be very expensive in situations where messages are small. Furthermore, the approach generally may not be selectively applied to messages, resulting in the overhead costs being incurred for messages that do not contain important data.

Based on the foregoing, an approach for implementing message queues in database systems that does not suffer from limitations in prior approaches is highly desirable.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram that depicts an approach for processing messages in a DBMS according to an embodiment of the invention.

DETAILED DESCRIPTION OF THE INVENTION

Figure 1A:
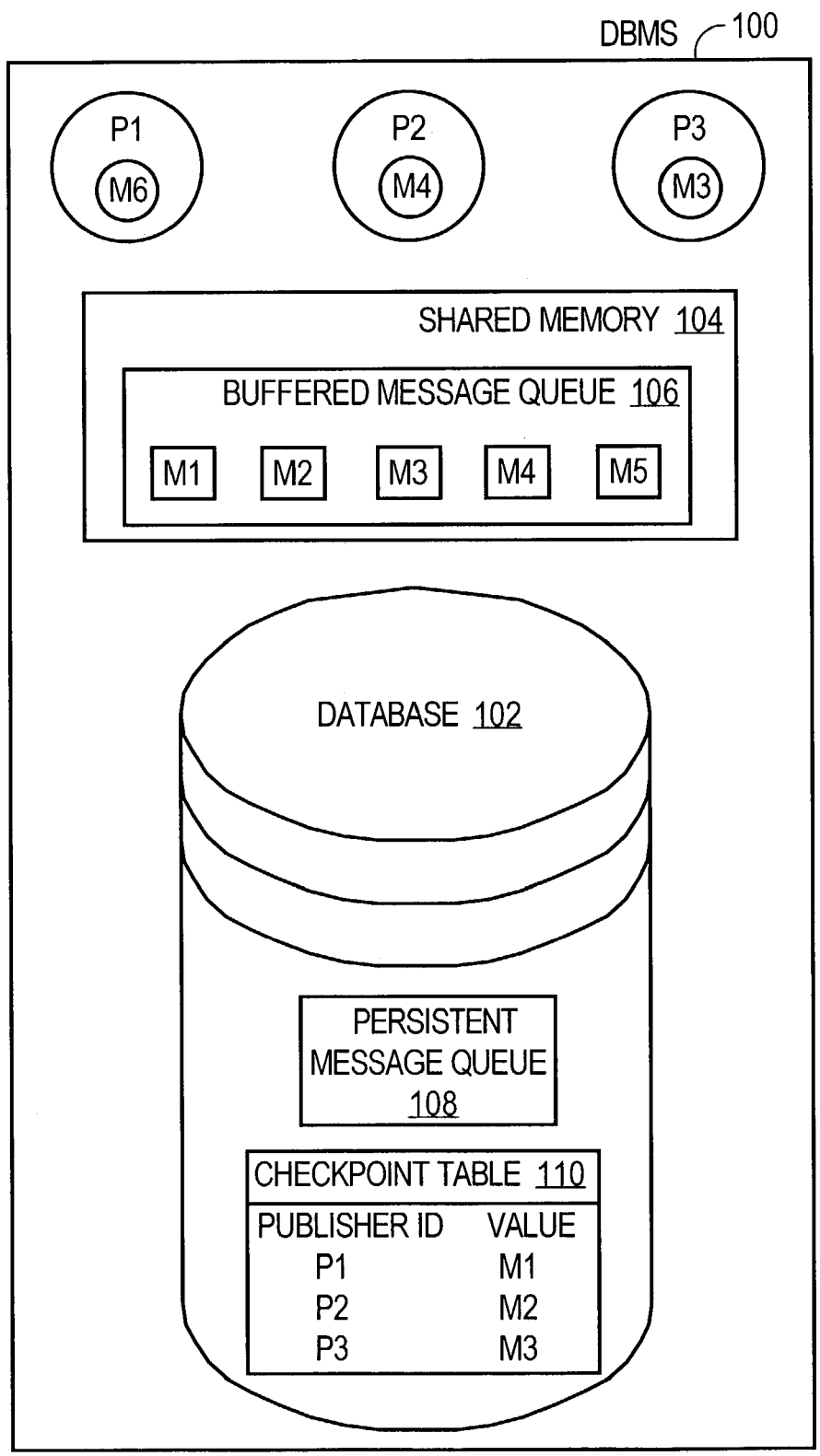
FIG. 1A is a block diagram that depicts a DBMS configured with a message queue according to an embodiment of the invention.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. In some instances, flow diagrams are used to depict steps performed in various embodiments of the invention. The invention is not limited to the particular order of steps depicted in the figures and the order may vary, depending upon the requirements of a particular implementation. Furthermore, steps that are depicted and described may be removed and/or other steps may be added, depending upon the requirements of a particular implementation. Various aspects of the invention are described hereinafter in the following sections:

I. OVERVIEW
II. BUFFERED MESSAGE QUEUE ARCHITECTURE
III. BUFFERED MESSAGE QUEUE CREATION AND OPERATION
IV. CONTENT-BASED PUBLISH AND SUBSCRIBE
V. TRANSFORMATION AND EVENT NOTIFICATIONS
VI. BUFFERED MESSAGE QUEUE CLEANUP
VII. UNLIMITED BUFFERED MESSAGE QUEUE WITH LIMITED SHARED MEMORY
VIII. GUARANTEED AT LEAST ONCE DELIVERY IN BUFFERED MESSAGE QUEUES
IX. DISTRIBUTED BUFFERED MESSAGE QUEUE IMPLEMENTATIONS
X. "ZERO COPY" BUFFERED MESSAGE QUEUES IN DATABASES
XI. TRANSACTIONAL ENQUEUE
XII. IMPLEMENTATION MECHANISMS, ALTERNATIVES & EXTENSIONS

I. Overview

A buffered message queue architecture for managing messages in a database management system is disclosed. As used herein, the term "buffered message queue" refers to a message queue implemented in a volatile memory, such as a RAM. The volatile memory may be a shared volatile memory that is accessible by a plurality of processes. According to one embodiment of the invention, an approach for managing messages in a database system includes creating a message queue in a shared volatile memory of the database system. A message is stored in the message queue and then a determination is made whether the message satisfies subscription data for a subscriber process. If so, then the message is provided to the subscriber process, without having to first store the message in a persistent message queue.

The buffered message queue architecture supports a publish and subscribe communication mechanism, where the message producers and message consumers may be decoupled from and independent of each other. An entity that produces a message is referred to as a "publisher." An entity interested in messages in a buffered message queue "subscribes" to the buffered message queue and is referred to as a "subscriber." When a publisher publishes or "enqueues" messages to the buffered message queue, the messages become available to the subscribers who may "consume" or "dequeue" the messages that they are eligible for from the buffered message queue.

The buffered message queue architecture provides all the functionality of a persistent publish-subscriber messaging system, without ever having to store the messages in persistent storage. The buffered message queue architecture provides better performance and scalability since no persistent operations are needed and no UNDO/REDO logs need to be maintained. As described in more detail hereinafter, messages published to the buffered message queue are delivered to all eligible subscribers at least once, even in the event of failures, as long as the application is "repeatable." This is in contrast to persistent messaging systems where there is exactly one delivery of messages to subscribers for all applications.

II. Buffered Message Queue Architecture

FIG. 1A is a block diagram that depicts a DBMS 100 configured with a buffered message queue in accordance with an embodiment of the invention. DBMS 100 includes a database 102 that may be implemented using any type of non-volatile storage device, such as one or more disks, and may include any type of data, for example, database tables. DBMS also includes a shared memory 104 that is implemented in a shared volatile memory, such as Random Access Memory (RAM).

DBMS 100 is configured with a buffered message queue 106 that is created in shared memory 104. The amount of shared memory 104 allocated to buffered message queue 106 may be fixed, or may change over time, depending upon the requirements of a particular implementation. For example, buffered message queue 106 may be allocated a specified amount of storage in shared memory 104 that does not change for the life of buffered message queue 106. As another example, buffered message queue 106 may be allocated an initial amount of storage in shared memory 104 that may be increased or decreased over time as storage requirements change. The amount of memory allocated to buffered message queue 106 may be specified automatically by a database server process or specified manually, for example by a database administrator. Example factors that may be considered in determining the amount of shared memory 104 allocated to buffered message queue 106 include, without limitation, the size of shared memory 104, the past and present amount of shared memory 104 required by processes accessing shared memory 104 and the estimated amount of data that will be stored in buffered message queue 106 at any given time.

DBMS 100 also includes a conventional persistent message queue 108 that is maintained in a database table in database 102. For purposes of explanation, embodiments of the invention are depicted in the figures and described in the context of a DBMS configured with a single buffered message queue disposed in a shared memory and a single persistent message queue implemented in a database. The invention, however, is not limited to this context and is applicable to arrangements with any number of buffered message queues and any number of persistent message queues.

DBMS 100 includes three processes P1, P2 and P3 that are each configured to act as publishers and enqueue messages into buffered message queue 106. Processes P1, P2 and P3 are also each configured to act as subscribers and subscribe to buffered message queue 106 and dequeue messages that they are eligible to dequeue. Hereinafter, processes are referred to as "publishers" when they are publishing messages and as subscribers when they are subscribing or dequeuing messages, e.g., publisher P1 or subscriber P1. Processes P1, P2 and P3 may be any type of processes and the invention is not limited to particular types of processes. Examples of processes P1, P2 and P3 include, without limitation, client processes, server processes and other internal DBMS administrative processes.

For purposes of explanation, embodiments of the invention are depicted in the figures and described in the context of processes P1 and P2 executing within DBMS 100. Processes P1, P2 and P3 may be client processes, i.e., client processes that can execute at any location so long as they can establish connectivity to DBMS 100. Processes P1, P2 and P3 may also be database server/background processes that execute within DBMS 100.

III. Buffered Message Queue Creation and Operation

Buffered message queues are created in shared memory in response to requests from processes. For example, process P1 may request the creation of buffered message queue 106. According to one embodiment of the invention, buffered message queues are related to persistent message queues and are created after persistent message queues have been created. For example, process P1 first requests the creation of persistent message queue 108. Process P1 may then request that a buffered message queue be added, which in the present example, causes the creation of buffered message queue 106.

According to another embodiment of the invention, buffered message queues are created in response to a request to enqueue a message to a buffered message queue, when a buffered message queue does not currently exist. For example, suppose that publisher P1 issues a request to enqueue a first message into buffered message queue 106 before buffered message queue 106 exists. An example of such a request issued by P1 is "ENQUEUE (MSG1, BUFFERED)," where MSG1 contains or points to, i.e., addresses, the first message and the BUFFERED flag specifies that the first message is to be enqueued to a buffered message queue, rather than persistent message queue 108. The processing of this request causes the creation of buffered message queue 106 in shared memory 104. The first message is then enqueued into buffered message queue 106.

A subscriber may subscribe to a buffered message queue whose messages the subscriber has an interest in receiving. When DBMS 100 receives a request to subscribe to buffered message queue 106, DBMS 100 stores the subscription data in persistent or non-persistent storage. For example, the subscription data may be stored in buffered message queue 106 or elsewhere in shared memory 104. The subscription data may also be stored in a non-volatile storage, such as database 102, albeit with a performance penalty associated with reading and writing to database 102. Subscribers may optionally specify a condition or rule indicating an interest in a subset of messages published to buffered message queue 106. DBMS 100 tracks all subscriptions to buffered message queue 106 and ensures that messages are received by all eligible subscribers.

Once buffered message queue 106 has been created, processes may begin enqueuing and dequeuing messages to and from message queue 106. Messages may be enqueued and dequeued in any manner, depending upon the requirements of a particular implementation. According to one embodiment of the invention, requests to enqueue and dequeue messages from a buffered message queue are processed by a database server process. The invention is not limited to processing of such requests by server processes, however, and other processes may be used for this purpose, depending upon the requirements of a particular implementation.

Publishers may issue enqueue requests as described above to enqueue messages. When DBMS 100 receives a request to enqueue a message to a buffered message queue, the message included in the request is copied to shared memory 104 and stored in buffered message queue 106. The message is then available for dequeuing by subscribers.

To dequeue a message from a buffered message queue, a subscriber requests that a message be dequeued. For example, subscriber P1 issues a dequeue request requesting that a message be dequeued from a buffered message queue. According to one embodiment of the invention, the dequeue request specifies a particular queue against which the dequeue request is to be processed. For example, the dequeue request may specify persistent message queue 108 or buffered message queue 106. An example dequeue request to dequeue a message from buffered message queue 106 is "DEQUEUE (BUFFERED)." An example dequeue request to dequeue a message from persistent message queue 108 is "DEQUEUE (NON-BUFFERED)" or "DEQUEUE (PERSISTENT)".

When a dequeue request is processed, the requesting process is provided access to a message in a buffered message queue. Providing access to a message may include providing a copy of a message to a requesting process. This approach may be used, for example, when the requesting process is a client process. Alternatively, a reference to the location of the message in the buffered message queue may be provided to the requesting process. This approach may be used, for example, when the requesting process is a database server process. As described in more detail hereinafter, after the requesting process is provided access to a message, the message may also be deleted from the message queue to free up space in the buffered message queue, depending upon the requirements of a particular implementation.

Enqueuing and dequeuing messages to and from buffered message queue 106 is performed directly in shared memory 104 without requiring the processing of SQL statements or the creation of UNDO or REDO data. Enqueuing and dequeuing messages to and from buffered message queue therefore consumes relatively fewer computational and storage resources, requires fewer disk I/O operations and requires relatively less time than enqueuing and dequeuing messages to persistent message queue 108.

Figure 1C:
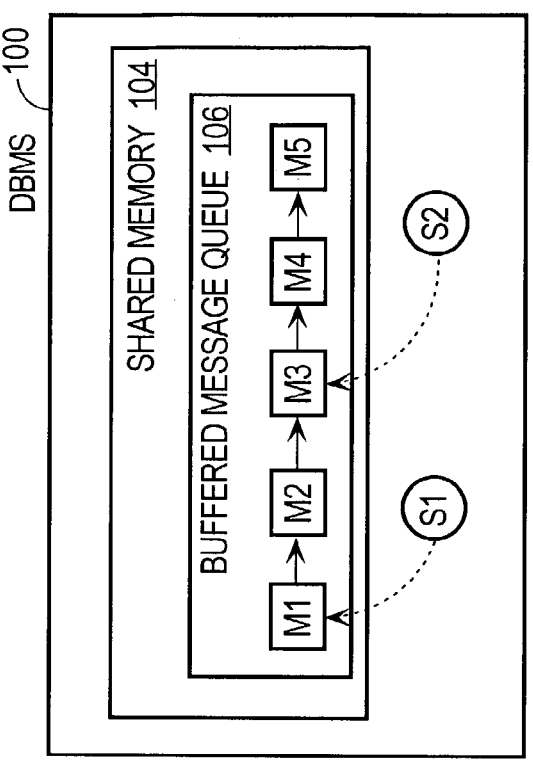
FIG. 1C is a block diagram that depicts how subscribers each maintain a reference to the next available message in a buffered message queue.
Figure 1B:
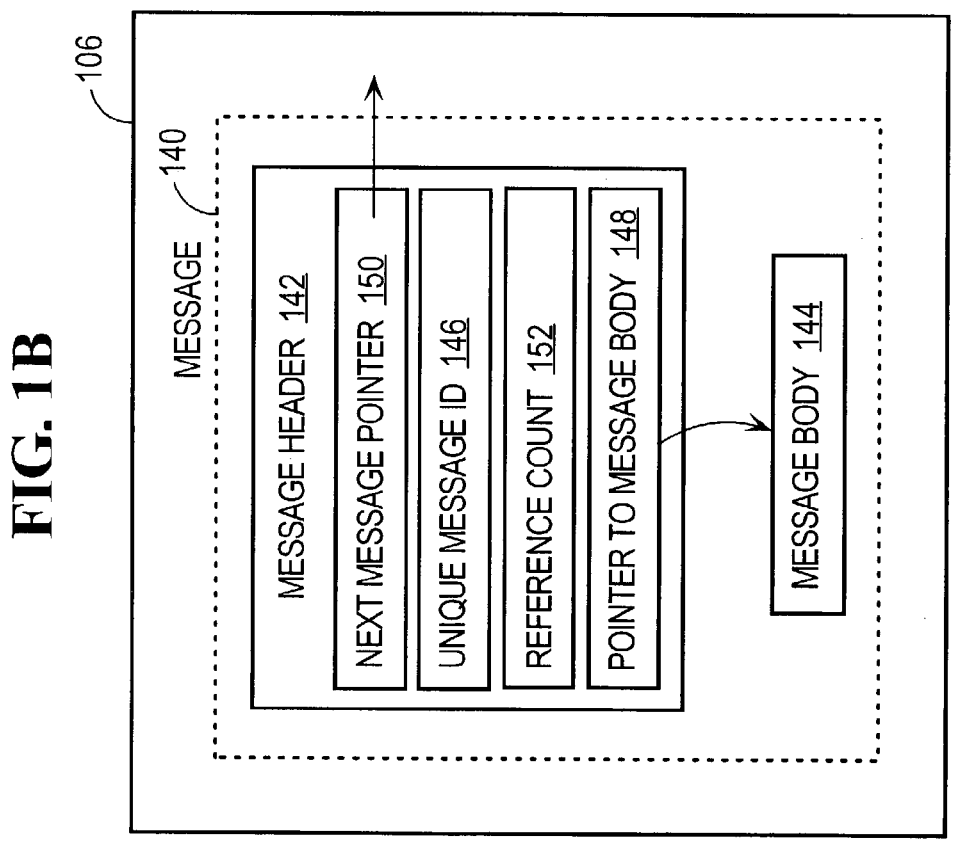
FIG. 1B is a block diagram that depicts an example buffered message queue message format according to an embodiment of the invention.

FIG. 1B is a block diagram that depicts an example buffered message queue message format according to an embodiment of the invention. A message 140 resides in buffered message queue 106 and includes a message header 142 and a message body 144. Message header 142 includes a unique message ID 146 that uniquely identifies message 140. Message header 142 also includes a pointer to message body 148 that references message body 144. Message header 142 is linked via a next message pointer 150 to other message headers in a single linked list in the order in which the messages were enqueued into buffered message queue 106. According to one embodiment of the invention, the unique message IDs of older messages are less than the unique message IDs of newer messages. Although message 140 may have multiple subscribers, only one copy of message 140 is maintained in buffered message queue 106. Message header 142 also includes a reference count 152 that indicates the number of subscribers to buffered message queue 106.

FIG. 1C is a block diagram that depicts how subscribers S1, S2 each maintain a reference to the next available message, M1 and M3, respectively, in buffered message queue 106.

According to one embodiment of the invention, messages are dequeued from buffered message queue 106 using a First-In-First-Out (FIFO) approach. According to the FIFO approach, messages are dequeued from buffered message queue 106 in the order in which the messages were enqueued in buffered message queue 106.

In FIG. 1, buffered message queue 106 contains five messages that are each assigned a message identifier that uniquely identifies the message and also specifies the position of each message in a sequence in which the messages were enqueued into buffered message queue 106. In the present example, the messages in buffered message queue 106 have been assigned message identifications of M1–M5. Using the FIFO approach, messages are dequeued in the order in which they were enqueued, starting with message M1 and proceeding to message M5. For example, the first time a subscriber P1 requests that a message be dequeued from buffered message queue 106, message M1 is dequeued, since message M1 was the first message enqueued in buffered message queue 106. The next time subscriber P1 requests that a message be dequeued from buffered message queue 106, message M2 is dequeued, since message M2 was the next message enqueued in buffered message queue 106 after message M1. When a message is dequeued by a subscriber, the reference count in the message header is decremented. Also, the subscriber points to the next message in the buffered message queue. When all subscribers have dequeued the message, the reference count is zero.

Subscribers may make dequeue requests at different rates. Therefore, according to one embodiment of the invention, a next message reference is maintained for each subscriber that identifies the next available message. In the present example, it is assumed that subscriber P1 has dequeued all five messages M1–M5 from buffered message queue 106 and the next message identifier for process P1 is M6, as indicated in FIG. 1. The next message identifiers for subscribers P2 and P3 are M4 and M3, respectively, indicating that subscribers P2 and P3 have dequeued messages M1–M3 and M1–M2, respectively. Thus, message M3 would be the next message provided to P3 from buffered message queue 106 on the next dequeue request from P3. Next message identifiers may be maintained in shared memory 104 by subscribers.

According to one embodiment of the invention, processes are permitted to "browse" messages in a buffered message queue. When a process browses a buffered message queue, copies of messages in the buffered message queue are supplied to the process without messages being deleted from the buffered message queue. In the present example, suppose that process P3 has dequeued messages M1 and M2. Suppose that process P3 now desires to browse messages M3–M5 in buffered message queue 106. Process P3 requests that the next message be dequeued in browse mode. For example, process P3 issues a request such as "DEQUEUE (BUFFERED, BROWSE)." The BROWSE flag indicates that after providing message M3 to process P3, message M3 is not to be deleted, even though processes P1 and P2 do not require message M3. Ordinarily, message M3 would be deleted from buffered message queue 106 since all other subscribers have already dequeued message M3. If process P3 issues another dequeue request with the BROWSE flag asserted, then message M4 is dequeued to process P3, but not deleted from buffered message queue 106. This process may be repeated as many times as necessary. According to one embodiment of the invention, a separate last message identifier is maintained for each process that issues a dequeue request in the browse mode, so that browsed messages can be tracked separately.

FIG. 2 is a block diagram 200 that depicts an approach for managing messages in a DBMS using a buffered message queue according to an embodiment of the invention. In step 202, a buffered message queue is created. For example, buffered message queue 106 is created in shared memory 104.

In step 204 a subscriber subscribes to receive messages from buffered message queue 106. This includes creating subscription data that defines one or more attributes of messages that are to be dequeued and provided to the subscriber. In step 206, a first message is stored in buffered message queue 106.

In step 208, the subscriber requests that a message be dequeued from buffered message queue 106. This may be accomplished, for example, by the subscriber generating and submitting a dequeue command.

In step 210, a determination is made whether the first message satisfies the subscription data for the subscriber. In step 212, if the first message satisfies the subscription data for the subscriber, then the first message is provided to the subscriber.

In step 214, the first message is deleted from buffered message queue 106 if the first message does not satisfy any other known subscription data and is therefore no longer needed.

IV. Content-Based Publish and Subscribe

According to the content-based publish and subscribe approach, messages are dequeued to subscribers based upon subscription data. The subscription data specifies subscribers and attributes of messages that each subscriber is to receive. According to one embodiment of the invention, the subscription data is an SQL condition that may include a reference to the message attributes. The SQL condition may also reference other objects in the database. Example attributes include, without limitation, a message identification, a message sender or recipient, a message type and a message priority. The subscription data may be implemented in any mechanism or formatted depending upon the requirements of a particular implementation. For example, subscription data may be stored in a look-up table or other data structure.

Consider the following example. Subscriber P2 subscribes to receive messages having a specified attribute, for example, messages relating to a particular subject. When subscriber P2 requests that a message be dequeued, a message in buffered message queue 106 that satisfies the subscription data for subscriber P2, i.e., that is related to the particular subject, is provided to subscriber P2. According to the FIFO approach, messages M1–M5 are each tested, in order, against the subscription data until a message is identified that satisfies the subscription data. This may result in messages being skipped that do not satisfy the subscription data for subscriber P2. For example, the first time that subscriber P2 submits a dequeue request, message M1 is tested against the subscription data for subscriber P2. If message M1 does not satisfy the subscription data for subscriber P2, then message M3 is tested against the subscription data. If message M3 satisfies the subscription data, then message M3 is provided to subscriber P2. If not, then the subscriber continues with the remaining messages in buffered message queue 106. If none of the messages in buffered message queue 106 satisfy the subscription data for subscriber P2, then an exception may be generated and provided to subscriber P2 to indicate this condition. According to one embodiment of the invention, the subscription data is evaluated at the time messages are enqueued into buffered message queue 106 and data indicating the subscribers receiving the messages stored in the message headers. Evaluation subscription data at dequeue time has the advantage that less state information needs to be maintained in shared memory 104. This also allows the publish operations to be fast, independent of the number of subscribers to buffered message queue 106.

V. Transformation and Event Notifications

The buffered message queue architecture described herein also supports message transformations, modification of the content and/or formatting of messages. This transformation may occur at enqueue time. Transformation may also occur at the time messages are delivered to subscribers, as specified by the subscribers. Transformation may be ruled based, meaning that different transformations may be specified depending upon the particular rule that was satisfied for a subscriber. Subscribers may be notified when new messages are published to buffered message queue 106 that satisfy the subscription data of the subscribers. Notification may take may forms, depending upon the requirements of a particular implementation. For example, subscribers may be notified by an http post request, or as a callback invoked in the client process or the database server.

VI. Buffered Message Queue Cleanup

Over time, buffered message queue 106 may contain a large number of messages that consume a significant amount of storage space. Eventually, there may be an insufficient amount of available space in buffered message queue to enqueue any additional messages. Therefore, according to one embodiment of the invention, messages that are no longer needed are deleted from buffered message queue 106. A message is considered to no longer be needed if the message has been dequeued to all known subscribers for which the message satisfies the corresponding subscription data. In the present example in FIG. 1, messages M1 and M2 have been dequeued, or at least been evaluated for dequeuing, by subscribers P1, P2 and P3. This is true since, as depicted in FIG. 1, subscriber P1 has last dequeued message M5, subscriber P2 has last dequeued message M3 and subscriber P3 has last dequeued message M2. Assuming that there are no other active subscribers than P1, P2 and P3, messages M1 and M2 are deleted from buffered message queue 106 to free up memory. This buffered message queue cleanup process may be performed at any time, depending upon the requirements of a particular implementation. For example, the amount of available free space in buffered message queue 106 may be periodically monitored and if it falls below a specified amount, then the buffered message queue cleanup process may be performed. According to one embodiment of the invention, the buffered message queue cleanup process is performed when the last subscriber dequeues the message, as indicated by a reference count of zero.

VII. Unlimited Buffered Message Queue with Limited Shared Memory

There may be situations where the amount of memory consumed by a buffered message queue reaches a maximum specified amount of memory allocated to the buffered message queue. This may occur, for example, when messages are enqueued into the buffered message queue faster than they are dequeued. One condition that might cause this is a delay in the dequeuing of messages from a buffered message queue attributable to a slow subscriber process. In this situation, no additional messages can be enqueued to the buffered message queue until either one or more messages are deleted from the buffered message queue or additional memory is allocated to the buffered message queue.

According to one embodiment of the invention, an approach referred to herein as "spillover" is used to manage the amount of available space in a buffered message queue. More specifically, spillover is used to address situations where a request is made to enqueue a new message into a buffered message queue when the buffered message queue does not currently have sufficient available space to store the new message. According to the spillover approach, the new message is stored ("spilled over") to a non-volatile storage instead of the buffered message queue. Only the message header is stored in the buffered message queue. The message header maintains the place of the new message in the buffered message queue. The message header contains data that identifies that the new message is stored on the non-volatile storage and may also specify the location on the non-volatile memory where the new message has been stored. When the message header is processed, the message is retrieved from the non-volatile storage. Therefore, the header functions as a placeholder in the buffered message queue for the new message stored on the non-volatile storage, while consuming significantly less space in the buffered message queue than if the new message itself was stored in the buffered message queue.

According to one embodiment of the invention, spilled over messages are stored in a persistent message queue on the non-volatile storage. Spillover may be implemented transparent to subscriber processes so that no changes are required to the enqueue and dequeue semantics used by subscriber processes.

Figure 3A:
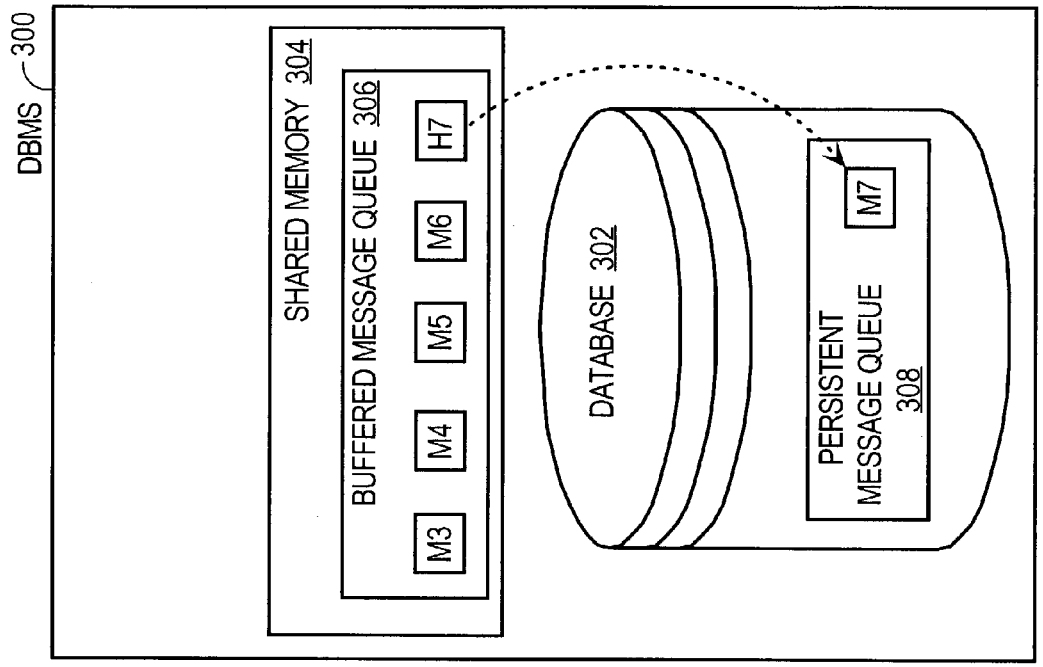
FIGS. 3A–3F are block diagrams that depict a database management system configured to perform message spillover in accordance with an embodiment of the invention.

FIG. 3A is a block diagram of a DBMS 300 configured to perform message spillover in accordance with an embodiment of the invention. DBMS 300 includes a database 302, a shared memory 304, a buffered message queue 306 disposed in shared memory 304 and a persistent message queue 308 stored on database 302.

A set of messages M3–M6 are currently stored in buffered message queue 306. Suppose that a publisher process submits a request to publish a new message M7 to buffered message queue 306. In accordance with an embodiment of the invention, a determination is made whether there is sufficient available space in buffered message queue 306 to store the new message M7. The determination may be made, for example, by computing the sum of the current amount of memory consumed by buffered message queue 306 and the additional amount of memory that would be required to store the new message M7, and comparing this sum to a specified amount of memory allocated to buffered message queue 306. If there is sufficient available space in buffered message queue 306 to store the new message M7, then the new message M7 is stored in buffered message queue 306 as previously described herein. This computation and check may be performed every time a request to enqueue a message is processed. Alternatively, the computation and check may be performed only if a threshold percentage, e.g., 50%, of the storage space allocated to buffered message queue 306 has been used.

Figure 3B:
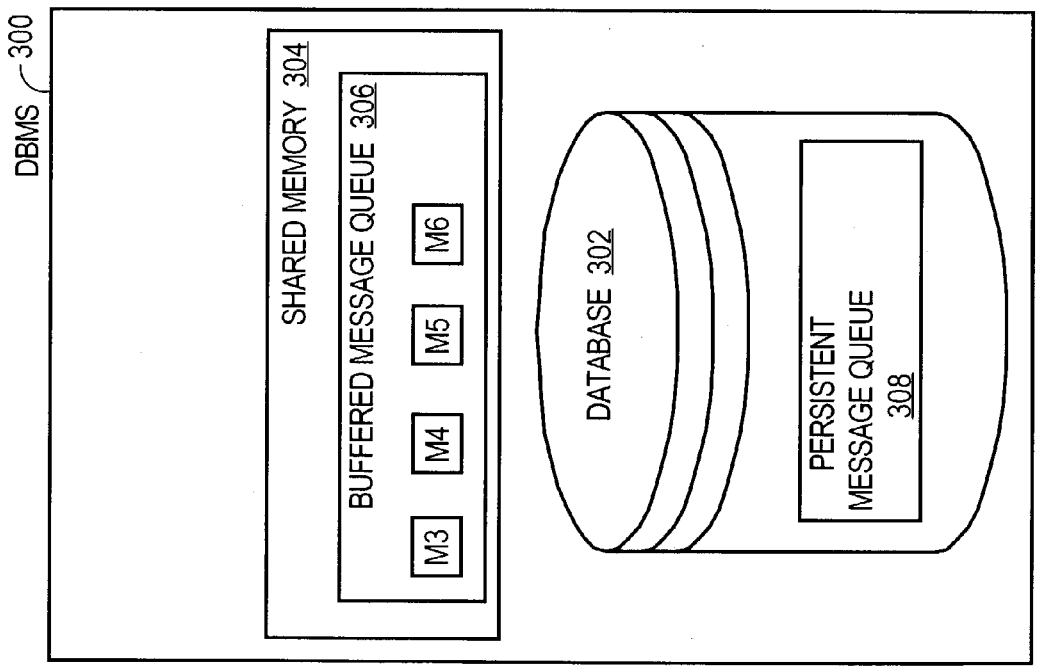

If a determination is made that there is insufficient available space in buffered message queue 306 to store the new message M7, then, as depicted in FIG. 3B, the new message M7 is stored to persistent message queue 308. In addition, a message header H7, for new message M7, is created and stored in buffered message queue 306. Message header H7 contains data that specifies that message M7 is stored in persistent message queue 308. Message header H7 may also specify an address where the new message M7 is stored. Message header H7 maintains the position of message M7 in buffered message queue 304 so that message M7 is processed in the same order as if message M7 had been stored in buffered message queue 306.

According to another embodiment of the invention, when a buffered message queue does not have enough available space to store a new message, then one or more messages that are currently stored in the buffered message queue are moved to a non-volatile storage to make space available for the new message in the buffered message queue. Only the message headers corresponding to the messages moved to the non-volatile storage remain in the buffered message queue. This may be performed, for example, when there is insufficient space in the buffered message queue to store a header for the new message.

For example, referring again to FIG. 3A, suppose that messages M3–M6 are currently stored in buffered message queue 306 and that a publisher process submits a request to publish a new message M7 to buffered message queue 306. Furthermore, a determination is made that there is not sufficient available space in buffered message queue 306 to store the new message M7.

Figure 3C:
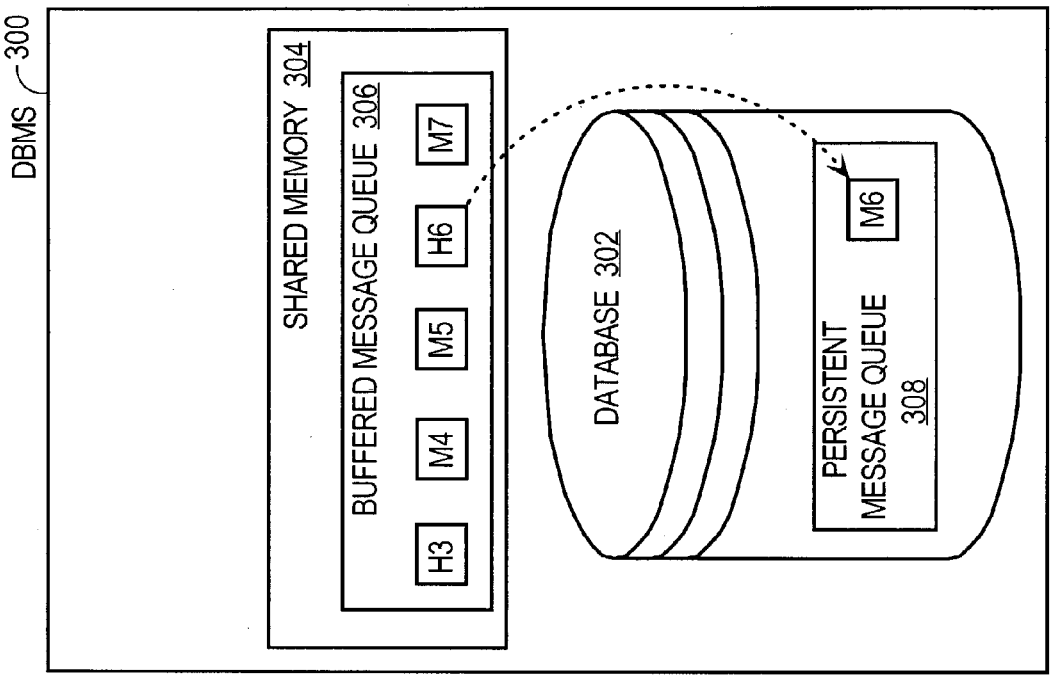
Figure 3D:
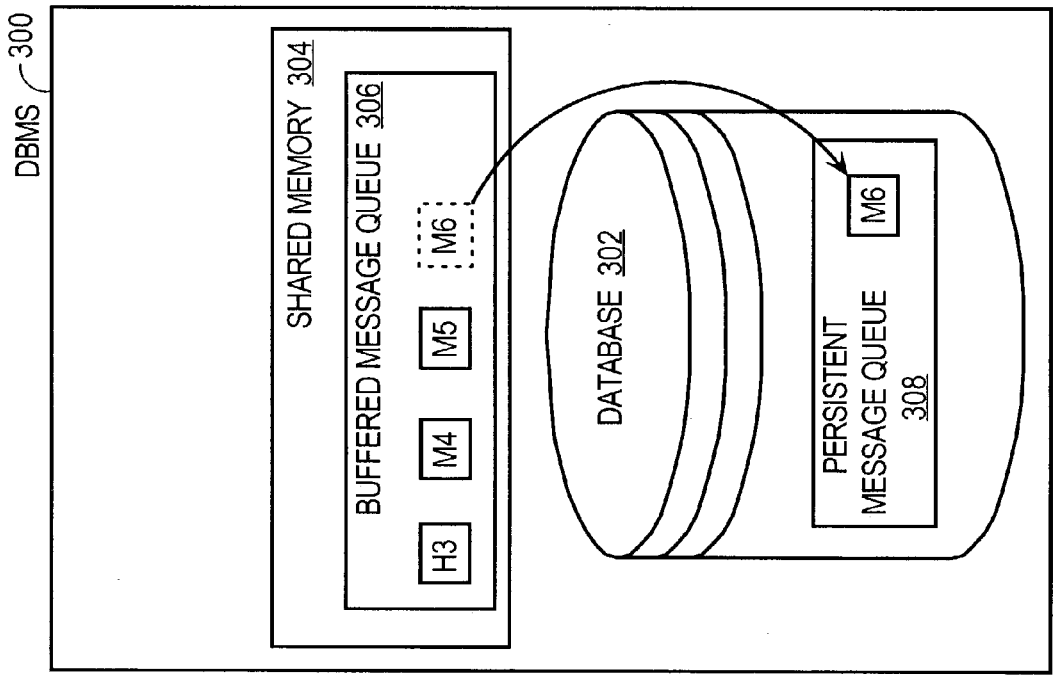

In accordance with this embodiment of the invention, as depicted in FIG. 3C, message M6 is moved from buffered message queue 306 to persistent storage to provide space for new message M7 in buffered message queue 306. As depicted in FIG. 3D, a message header H6 for message M6 is stored in buffered message queue 306. Message M7 is then stored in buffered message queue 306.

Although this embodiment is described and depicted in the figures in the context of moving a single message (M3) to a non-volatile storage, any number of messages may be moved from a buffered message queue to a non-volatile storage, depending upon the amount of space required by the new message.

The "cost" associated with performing spillover for a particular message refers to the amount of computational resources and/or time that is attributable to enqueuing and dequeuing the particular message to a persistent message queue that would otherwise not be incurred had the particular message been enqueued and dequeued to a buffered message queue. The cost associated with performing spillover is not the same for all messages since the cost is dependent upon the number of dequeues of the message that are made. For example, suppose that messages M1 and M2 are enqueued to a persistent message queue. Suppose further that message M1 is dequeued once from the persistent message queue, while message M2 is dequeued six times from the persistent message queue. In this situation, the cost associated with spilling over message M2 is relatively higher than spilling over message M1. Thus, given a choice between spilling over message M1 or M2, it would be more beneficial to spillover message M1, since the cost of doing so would be lower than spilling over message M2.

The number of dequeues that are yet to be made for a queued message is often related to the age of the message. In particular, where an older message in a buffered message queue has already been dequeued to most subscribers and a newer message will need to be dequeued to several subscribers, then the cost of spilling over the older message will be lower than spilling over the newer message, since relatively fewer accesses will be made to retrieve the older message from the non-volatile storage. Therefore, according to one embodiment of the invention, older messages are spilled over to persistent memory before newer messages to reduce the cost of associated with performing spillover.

Figure 3E:
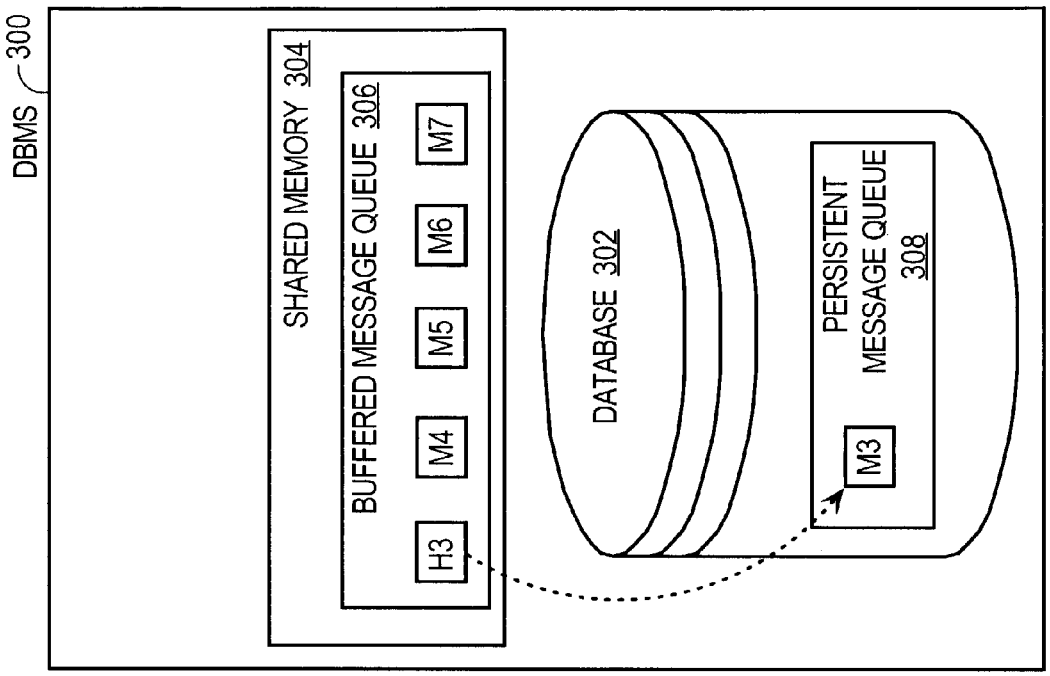
Figure 3F:
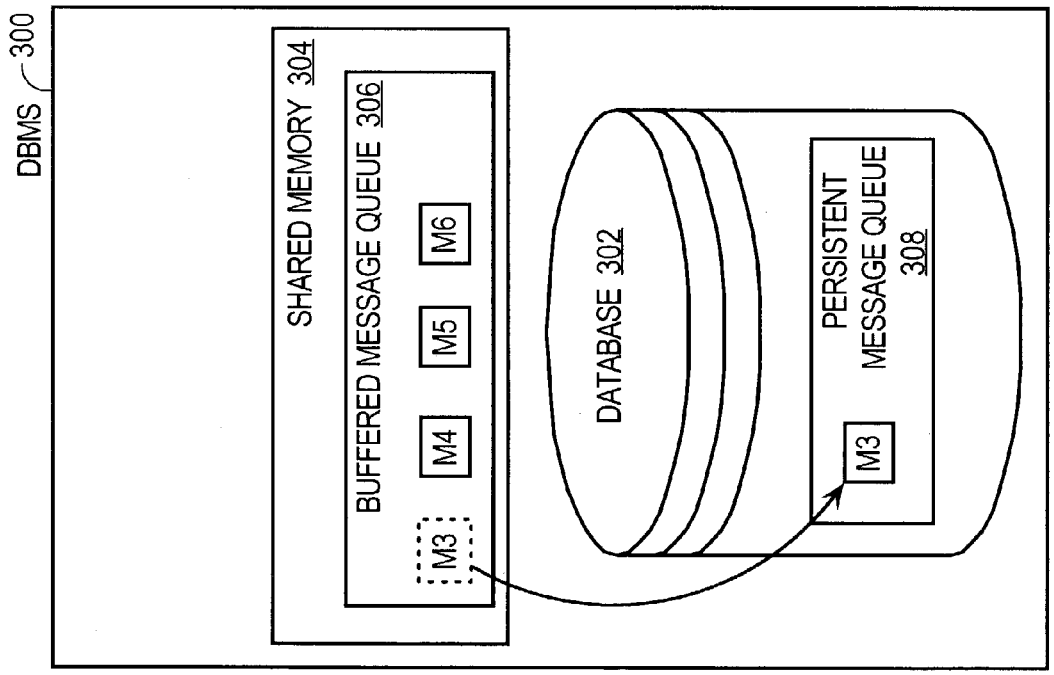

Referring to FIG. 3E, suppose that message M3 has already been dequeued to all subscribers except for one particular subscriber. The particular subscriber may be dequeuing messages at a substantially slower pace than the other subscribers. Suppose further that new message M7 will need to be dequeued to several subscribers. In this situation, there is likely to be a smaller cost associated with spilling over message M3 rather than the new message M7 since message M3 would only need to be retrieved once from persistent message queue 308, while message M7 would need to be retrieved at least once, and probably several times, from persistent message queue 308. Therefore, in accordance with this embodiment of the invention, message M3 is spilled over rather than new message M7. As depicted in FIG. 3E, message M3 is moved from buffered message queue 306 to persistent storage to provide space for new message M7 in buffered message queue 306. As depicted in FIG. 3F, a message header H3 for message M3 is stored in buffered message queue 306. Message M7 is then stored in buffered message queue 306.

Although the spillover approach described herein is described in the context of being initiated in response to a request to enqueue a new message into a buffered message queue, the spillover approach may be initiated in other situations. For example, the amount of available space in a buffered message queue may be periodically monitored and if the amount of available space falls below a specified amount, then spillover may be initiated with respect to messages currently stored in the buffered message queue.

Figure 4:
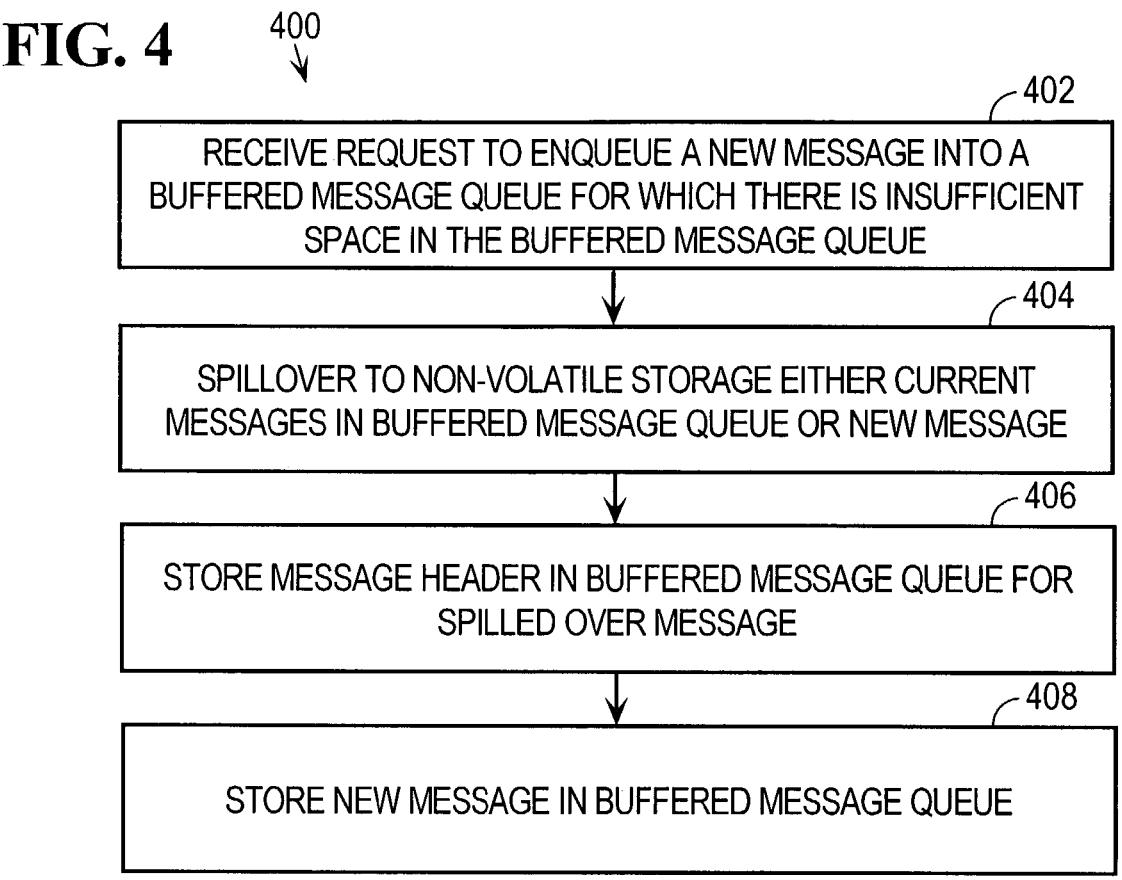
FIG. 4 is a flow diagram that depicts an approach for performing message spillover in accordance with an embodiment of the invention.

FIG. 4 is a flow diagram 400 that depicts an approach for performing message spillover according to an embodiment of the invention. In step 402, a request is received to enqueue a new message into a buffered message queue for which there is insufficient space to store the new message in the buffered message queue. For example, a request is received to enqueue new message M7 in buffered message queue 306 when there is currently insufficient space to store new message M7 in buffered message queue 306.

In step 404, either current messages in the buffered message queue or the new message is spilled over to a non-volatile storage. For example, either one or more of messages M3–M6 or new message M7 are spilled over to persistent message queue 308, depending upon whether a particular implementation is configured to spillover older messages before new messages, as described herein.

In step 406, a message header is generated and stored in the buffered message queue for the messages that are spilled over to the non-volatile storage. For example, if message M3 is spilled over to database 302, then message header H3 is stored in buffered message queue 306. Alternatively, if new message M7 is spilled over to persistent message queue 308, then message header H7 is stored in buffered message queue 306.

In step 408, the new message is stored in the buffered message queue, assuming the new message was not spilled over to a persistent message queue.

VIII. Guaranteed at Least Once Delivery in Buffered Message Queues

Since buffered message queues are created and maintained in shared volatile memory, there may be situations where a failure causes the loss of messages and other data contained in a buffered message queue. Example failures that might cause the loss of message data in buffered message queues include, without limitation, a failure of DBMS 100, shared memory 104 or of buffered message queue 106. Similarly, when a subscriber dequeues a message, as opposed to browsing the message, the message is consumed for that particular subscriber. If a failure causes the loss of the dequeued message at the subscriber, the subscriber will not be able to obtain another copy of the message from buffered message queue 106 since the message will be marked as being consumed by the subscriber.

According to one embodiment of the invention, subscribers are configured to issue browse requests, which results in the subscribers getting copies or references to buffered messages, depending upon whether the subscribers are client processes or server processes. The subscribers then process the messages as necessary. After a subscriber has completed processing of a message, the subscriber issues a dequeue request to cause the message to be marked as consumed by the subscriber. This guarantees that a message is not removed from buffered message queue 106 until all subscribers have completed processing the message.

According to one embodiment of the invention, a form of checkpointing is employed to provide recovery of a buffered message queue after a failure where all messages in the buffered message queue are lost. Referring to FIG. 1, a checkpoint table 110 is generated and stored in a non-volatile storage, such as database 102. Checkpoint table 110 is described herein in the context of being stored in database 102, but the invention is not limited to this context and may be stored on any non-volatile storage. According to one embodiment of the invention, checkpoint table 110 contains values that identify, for each publisher, the last message published and dequeued by all eligible subscribers, as determined by their respective subscription data. The messages indicated by checkpoint table 110, and all messages published to buffered message queue 106 prior to the messages indicated by checkpoint table 110, do not need to be restored to buffered message queue 106 after a failure since these messages have all been dequeued by all eligible subscribers.

In the present example, checkpoint table 110 includes three entries associated with publishers P1, P2 and P3. The first entry for publisher P1 indicates that message M1 was the last message published by publisher P1 to buffered message queue 106 that was dequeued by all eligible subscribers. The second entry for publisher P2 indicates that message M2 was the last message published by publisher P2 to buffered message queue 106 that was dequeued by all eligible subscribers. The third entry for publisher P3 indicates that message M3 was the last message published by publisher P3 to buffered message queue 106 that was dequeued by all eligible subscribers. Note that the checkpoint values stored in checkpoint table 110 may be any data that is understood by each respective publisher. Checkpoint table 110 may be created and initialized at any time, depending upon the requirements of a particular implementation.

Suppose now that a failure causes the loss of buffered message queue 106 and messages M1–M5 contained therein. During recovery, buffered message queue 106 is re-generated in shared memory 104. Checkpoint table 110 is retrieved from non-volatile storage and each checkpoint value is provided to its respective publisher. For example, the checkpoint value indicating that message M1 was the last message published by publisher P1 and dequeued by all subscribers is provided to publisher P1. All publishers then re-publish to buffered message queue 106 all messages after the message identified by their respective checkpoint value. For example, publisher P1 re-publishes to buffered message queue 106 all messages published by publisher P1 after message M1.

The values in checkpoint table 110 may be periodically updated to reflect dequeue requests that have been processed since the time the values in checkpoint table 110 were initially determined or since the last time that the values in checkpoint table 110 were updated. For example, suppose that publisher P1 publishes message M4 to buffered message queue 106 and that message M4 is dequeued by all eligible subscribers. The checkpoint value in checkpoint table 110 associated with publisher P1 is updated to reflect that message M4 was the last message both published by publisher P1 to buffered message queue 106 and dequeued by all eligible subscribers. After a failure and the retrieval of checkpoint table 110, the checkpoint value for publisher P1 is provided to publisher P1. Publisher P1 re-publishes all messages published to buffered message queue after message M4. The frequency at which the values in checkpoint table 110 are updated may vary depending upon the requirements of a particular implementation. Updating the values in checkpoint table 110 more frequently requires more system resources, but reduces the number of messages that have to be re-published to buffered message queue 106 in the event of a failure.

This checkpointing approach guarantees, subject to the availability of checkpoint table 110, that each subscriber will receive at least one copy of each message in buffered message queue 106 that satisfies the subscriber's subscription data, even if a failure causes the loss of all messages in buffered message queue 106. Furthermore, compared to conventional recovery mechanisms, the approach reduces the amount of data that must be maintained in volatile storage, since only checkpoint table 110 must be maintained in a non-volatile storage, and not all of the messages.

One consequence of the approach is that some processes may be required to re-publish messages to a buffered message queue as previously described. In some situations, it may also be possible that processes that dequeued messages prior to the failure may receive duplicate copies of some messages from the buffered message queue. Thus, the approach guarantees that subscribers will receive the messages they are supposed to receive at least once, even in the event of a failure.

Figure 5:
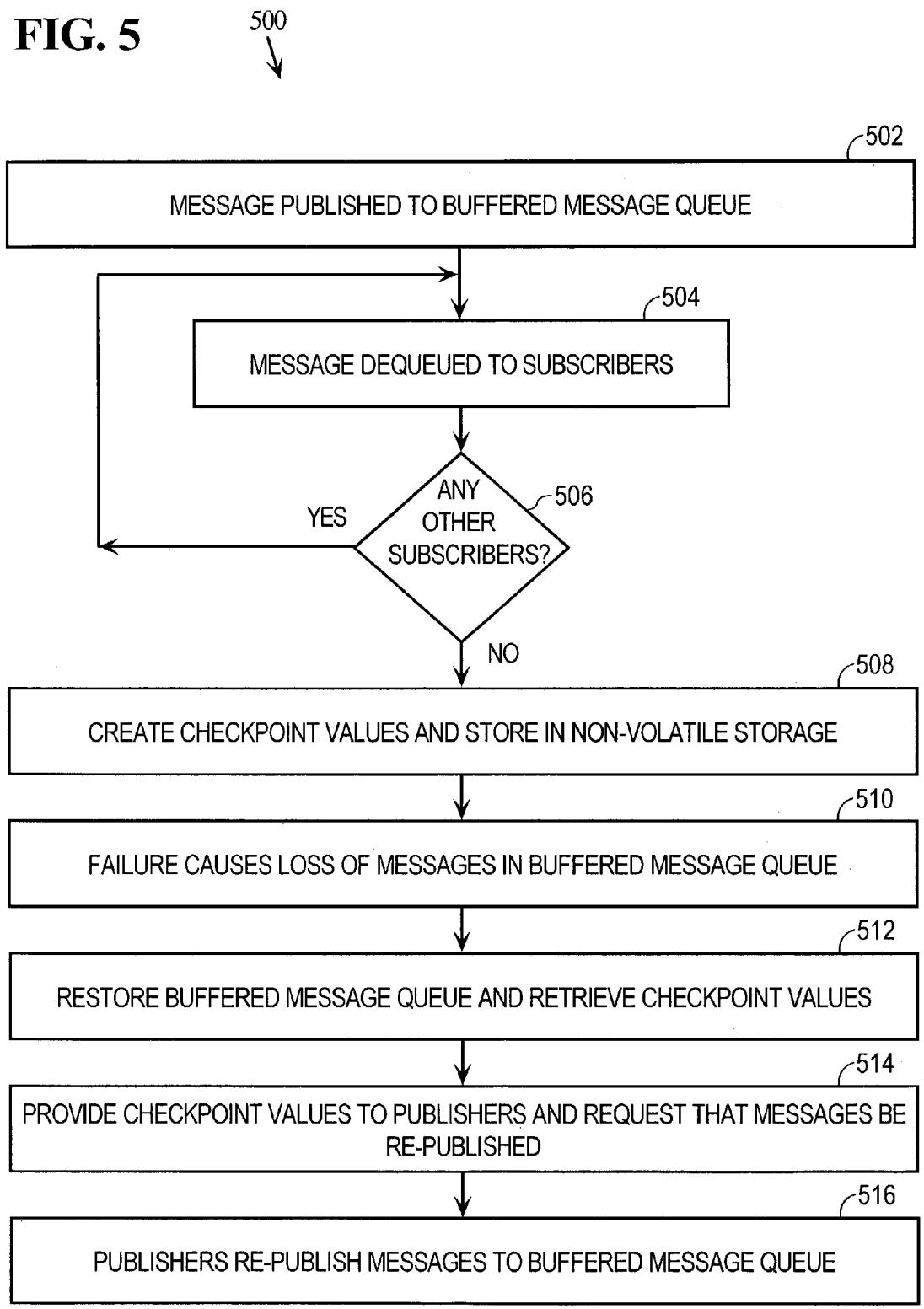
FIG. 5 is a flow diagram that depicts an approach for providing buffered message queue recovery using a single checkpoint value according to an embodiment of the invention.

FIG. 5 is a flow diagram 500 that depicts an approach for providing buffered message queue recovery using checkpoint values according to an embodiment of the invention. In step 502, publisher P1 publishes a message to buffered message queue 106. In step 504, the message is dequeued to one or more subscribers. In the present example, the message is dequeued to process P3.

In step 506, a determination is made whether the message satisfies subscription data for any other subscribers. If yes, then control returns to step 504 where the message is dequeued to those subscribers for which the message satisfies the corresponding subscription data. If not, then control proceeds to step 508, where a checkpoint value in checkpoint table 110 is created for publisher P1. The checkpoint value for publisher P1 indicates that message M1 was the last message published by publisher P1 to buffered message queue 106 and dequeued by all eligible subscribers. At some point in time, checkpoint table 110 is stored to a non-volatile memory, such as database 102.

In step 510, a failure occurs and the message data contained in buffered message queue 106 is lost. In step 512, buffered message queue 106 is restored and checkpoint table 110 is retrieved from the non-volatile storage, which in the present example is database 102.

In step 514, the checkpoint value for publisher P1 from checkpoint table 110 is provided to publisher P1 and publisher P1 is requested to re-publish messages published to buffered message queue 106 by publisher P1 after message M1. In step 516, publisher P1 re-publishes messages published by publisher P1 to buffered message queue 106 after message M1.

According to one embodiment of the invention, checkpoint values are updated in response to receipt of an acknowledge message from all eligible subscribers indicating that the subscribers have received dequeued messages. For example, suppose that a remote subscriber P3 submits a request to dequeue a message from buffered message queue 106. A determination is made that message M3 is the next message that satisfies the subscription data for subscriber P3 and a copy of message M3, or a reference to message M3, is provided to subscriber P3. Upon successful receipt of message M3, subscriber P3 generates and provides to DBMS 100 an acknowledge message indicating that message M3 was successfully received by subscriber P3. In response to receipt of the acknowledge message from subscriber P3, a determination is made whether any other eligible subscribers have not yet dequeued message M3. If not, then the checkpoint value for the publisher of message M3 is updated to reflect that message M3 has been dequeued to all eligible subscribers. This approach ensures that subscriber P3 will receive a copy of message M3 during recovery if a failure occurs after message M3 is dequeued, but before subscriber P3 receives message M3. This approach is particularly useful in distributed database implementations where a failure of a communications link may prevent receipt by a subscriber of a dequeued message. If an acknowledge message is not received, then the corresponding checkpoint value for the publisher is not updated.

According to another embodiment of the invention, an acknowledge message may acknowledge receipt by a subscriber of two or more dequeued messages. For example, suppose that subscriber P3 makes three requests to dequeue messages from buffered message queue 106 and messages M3–M5 are provided to subscriber P3. Subscriber P3 then generates and provides to DBMS 100 an acknowledge message that indicates that messages M3–M5 were successfully received by subscriber P3.

There may be situations where a failure prevents generation or receipt of an acknowledge message. For example, a subscriber may have failed or be executing extremely slowly, due to heavy loading, which prevents, or at least significantly delays, the generation of an acknowledge message. As another example, a subscriber may have generated and transmitted an acknowledge message, but a communications failure prevents the acknowledge message from being received by the DBMS from which the message was dequeued. Therefore, according to one embodiment of the invention, if an acknowledge message is not received from a subscriber within a specified amount of time of dequeuing a message, then a failure is presumed to have occurred. In this situation, administrative personnel may be notified of a potential problem with the subscriber process so that appropriate action may be taken.

IX. Distributed Buffered Message Queue Implementations

Figure 6:
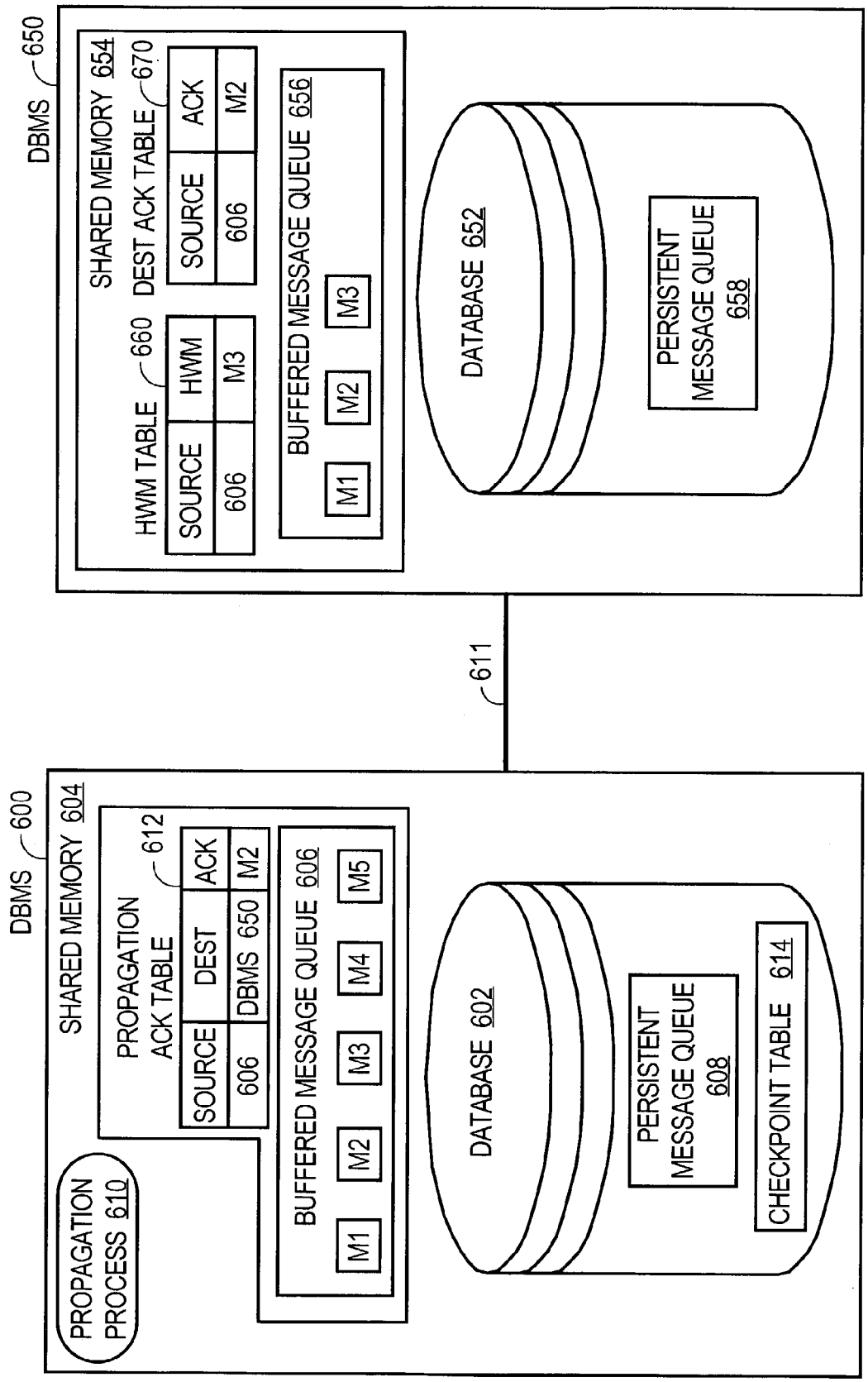
FIG. 6 is a block diagram that depicts a distributed database arrangement.

The approach described herein for using buffered message queues to manage messages in database systems is applicable to distributed database implementations where messages are propagated between distributed database systems with buffered message queues. FIG. 6 is a block diagram that depicts a distributed database arrangement that includes a DBMS 600 with a database 602, a shared memory 604, a buffered message queue 606 disposed in shared memory 604 and a persistent message queue 608.

DBMS 600 is communicatively coupled via a communications link 611 to a remote DBMS 650. DBMS 650 includes a database 652, a shared memory 654, a buffered message queue 656 disposed in shared memory 654 and a persistent message queue 658. Communications link 611 may be implemented by any medium or mechanism that provides for the exchange of data between DBMS 600 and DBMS 650. Examples of communications link 611 include, without limitation, a network such as a Local Area Network (LAN), Wide Area Network (WAN), Ethernet or the Internet, or one or more terrestrial, satellite or wireless links.

According to one embodiment of the invention, DBMS 600 includes a propagation process 610 that is configured to propagate messages from buffered message queue 606 on DBMS 600 to buffered message queue 656 on DBMS 650. A quality of service of "at least once" delivery is guaranteed for propagation of messages from a source buffered message queue on one DBMS to a destination buffered message queue on another DBMS. This presumes the availability of repeatable applications that are capable of re-enqueuing messages based on a given checkpoint value, as described herein previously.

In the example depicted in FIG. 6, buffered message queue 606 includes messages M1–M5 and messages M1–M3 have been propagated from buffered message queue 606 to buffered message queue 656. In this scenario, message M3 (at DBMS 650) is considered to be the high water mark (HWM). The HWM represents the latest message that has been enqueued to a destination DBMS from a specific source buffered message queue. A HWM table 660 is maintained in shared memory 654 and contains an entry for each source buffered message queue/destination buffered message queue pair. Messages M1–M3 are not deleted immediately after they are propagated to the destination DBMS. Rather, they are deleted only when the source DBMS has determined that the messages have been consumed by all subscribers at the destination DBMS. In the present example, DBMS 600 receives an acknowledgment from DBMS 650 indicating the messages that have been consumed by all subscribers at DBMS 650. Message identifiers are strictly increasing and messages are consumed in FIFO order. Hence, it is sufficient for DBMS 650 to send as an acknowledgment, the highest message identifier, for all messages previously received from DBMS 600, that has been consumed by all subscribers on DBMS 650. A propagation acknowledgment table 612 is maintained in shared memory 604 of DBMS 600. Propagation acknowledgment table 612 contains an entry for each source buffered message queue/destination message queue pair.

The destination DBMS 650 keeps track, in a destination acknowledgment table 670 maintained in shared memory 654, of the highest message identifier from the source buffered message queue that has been consumed by all of its subscribers. Destination acknowledgment table 670 contains an entry for each source buffered message queue/destination buffered message queue pair. The values are provided to DBMS 600 and used by DBMS 600 as propagation acknowledgment values for propagation acknowledgment table 612. DBMS 600 may also periodically poll DBMS 650 for the acknowledgments. In the present example, all messages up to message M2 have been completely consumed by all subscribers at DBMS 650. Hence, M2 is returned to DBMS 600 as the propagation acknowledgment and stored in propagation acknowledgment table 612. A checkpoint table 614 is maintained on DBMS 100 and the values contained therein are updated after all subscribers have consumed a message.

The frequency and specific manner in which messages are propagated from buffered message queue 606 to buffered message queue 656 may vary depending upon the requirements of a particular implementation and the invention is not limited to any particular approach. For example, bulk transfers may be used to propagate groups of messages. The frequency at which new messages are enqueued into buffered message queue 606 and the frequency at which messages are propagated from buffered message queue 606 to buffered message queue 656 determine how current buffered message queue 656 is with respect to buffered message queue 606. In the present example, messages M4 and M5 were enqueued in buffered message queue 606 since the last propagation of messages from buffered message queue 606 to buffered message queue 656.

According to one embodiment of the invention, propagation acknowledgement table 612 is used to identify one or more messages which, after a failure of DBMS 650, DBMS 600 or propagation process 610.

In the event of a failure of DBMS 650, messages that were enqueued into buffered message queue 606 after the message identified in propagation acknowledgment table 612, are re-propagated from buffered message queue 606 to buffered message queue 656. Messages enqueued into buffered message queue 606 on or before the message indicated by propagation acknowledgment table 612 do not need to be re-propagated from buffered message queue 606 to buffered message queue 656 since those messages were already consumed by all eligible processes on DBMS 650.

In the event of a failure of DBMS 600, propagation process 610 will also fail as it is a process associated with DBMS 600. When DMBS 600 re-starts, the repeatable application enqueueing to DBMS 600 queries checkpoint table 614 to determine where to start re-enqueueing messages. That is, the application starts re-enqueuing messages from the messages identified in checkpoint table 614. All messages in buffered message queue 606 are propagated to buffered message queue 656, which may result in some duplicate messages being sent to DBMS 650, depending upon the frequency at which the values in checkpoint table 614 were updated.

In the event of a failure of propagation process 610, DBMS 600 spawns a new propagation process. The new propagation process queries DBMS 650 to obtain the HWM value in the HWM table 660 for DBMS 600, which in the present example is message M3. The new propagation process then begins propagating messages with the next message onward, i.e., from message M4 onward. This approach avoids propagating duplicate messages when propagation process 610 fails.

The frequency at which propagation acknowledgment table 612 is updated may vary according to the requirements of a particular implementation. Updating propagation acknowledgment table 612 more frequently will generally reduce the number of messages that need to be re-propagated after a failure. Also, the memory of buffered message queue 606 may be freed up more aggressively. Further, checkpoint table 614 can also be updated more aggressively, which reduces the cost and time involved in re-publishing messages to buffered message queue 606 during recovery.

According to one embodiment of the invention, propagation acknowledgment table 612 is stored on a non-volatile storage, such as database 602. This ensures that propagation acknowledgment table 612 may be recovered after a failure of DBMS 600. This is not required, however, and propagation acknowledgment table 612 may be stored in a volatile memory, such as shared memory 604.

Figure 7:
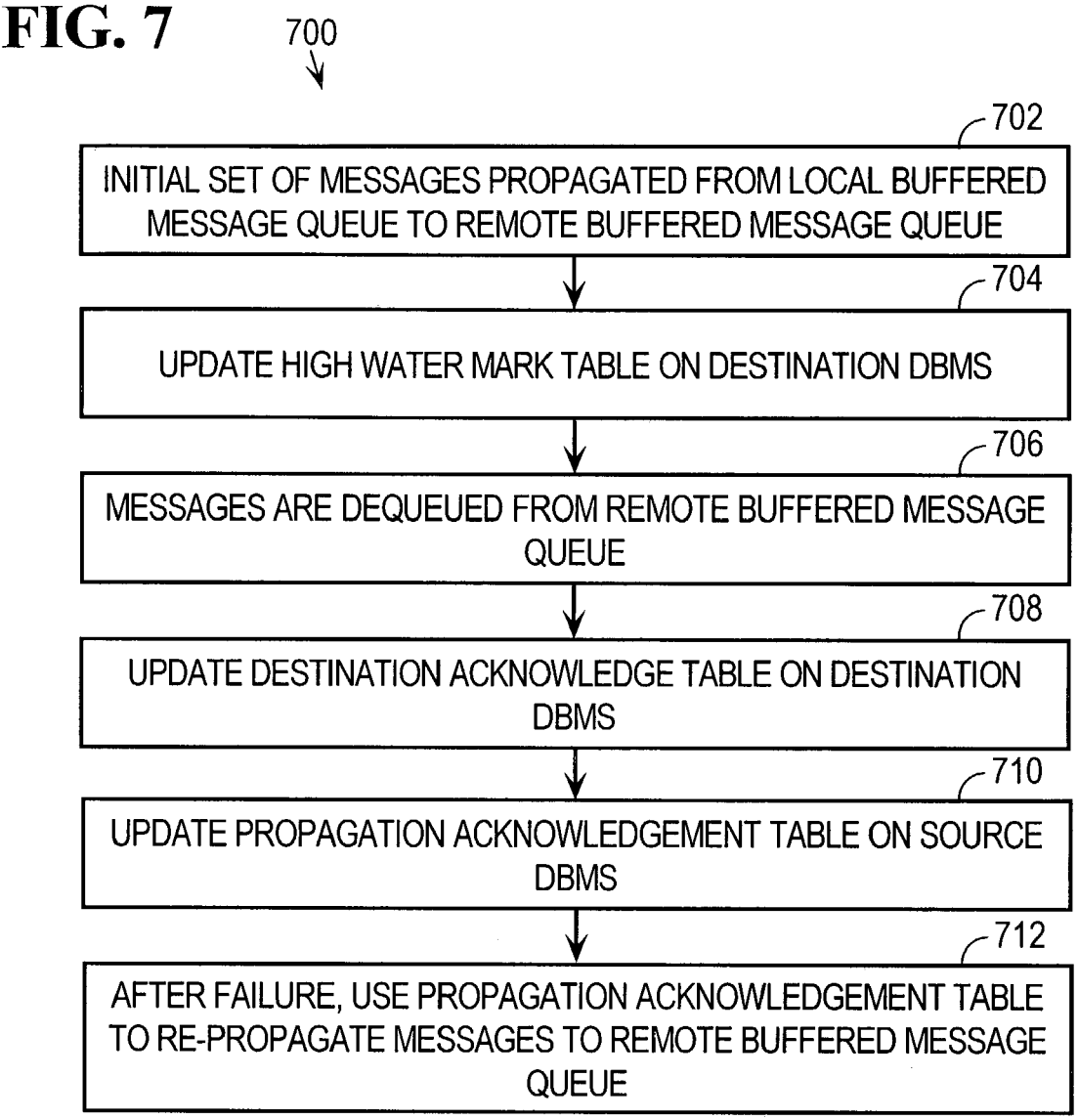
FIG. 7 is a flow diagram that depicts an approach for using a propagation acknowledgement table to provide for re-propagation of messages to a destination DBMS after a failure, according to an embodiment of the invention.

FIG. 7 is a flow diagram 700 that depicts an approach for using a propagation acknowledgment table to provide for re-propagation of messages to a destination DBMS after a failure, according to an embodiment of the invention. In step 702, an initial set of messages is propagated from a local buffered message queue to a remote buffered message queue. For example, messages M1–M3 are propagated from buffered message queue 606 on DBMS 600 to buffered message queue 656 on DBMS 650.

In step 704, a high water mark table on the destination DBMS is updated to reflect the latest message to be enqueued in the destination DBMS. In the present example, HWM table 660 is updated to reflect that message M3 is the last message from buffered message queue 606 to be enqueued in buffered message queue 656 on destination DBMS 650.

In step 706, messages are dequeued to subscribers at the remote buffered message queue on the destination DBMS. In the present example, messages M1 and M2 are dequeued to all eligible subscribers to buffered message queue 656.

In step 708, the destination acknowledgement table is updated to reflect the messages dequeued at the destination DBMS. In the present example, a value in destination acknowledgment table 670 is updated to reflect that, of the messages in buffered message queue 656 from buffered message queue 606, all messages up to message M2 have been dequeued by all eligible subscribers.

In step 710, the propagation acknowledgement table on the source DBMS is updated to reflect the messages from the source DBMS that have been dequeued by all eligible subscribers on the destination DBMS. In the present example, DBMS 800 obtains the value from destination acknowledgement table 670 that corresponds to buffered message queue 606, namely, the value that indicates message M2.

In step 712, after a failure that cause the loss of messages in the remote buffered message queue, a value from the propagation acknowledgement table 612 is used to re-propagate messages to the remote buffered message queue. In the present example, after a failure that cause the loss of messages from buffered message queue 656, the value from propagation acknowledgment table 612 corresponding to the source/destination pair of buffered message queue 606 and DBMS 650 is used to re-propagate messages to buffered message queue 656. Messages M3–M5 were enqueued in buffered message queue 606 after message M2 specified by the corresponding value in propagation acknowledgment table 612. Accordingly, messages M3–M5 are propagated from buffered message queue 606 to buffered message queue 656.

Propagation values may also be used to perform buffered message queue cleanup on a local buffered message queue. According to one embodiment of the invention, the checkpoint table for the local buffered message queue and the propagation acknowledgement table value for the local buffered message queue/remote buffered message queue pair are used to determine which messages can be removed from the local buffered message queue. More particularly, messages up to the oldest message specified by both the checkpoint table for the local buffered message queue and the propagation acknowledgement table value for the remote buffered message queue are removed from the local buffered message queue. In the present example, propagation acknowledgment table 612 specifies message M2. If checkpoint table 614 specifies message M1, then message M1 is not required by either buffered message queue 606 or buffered message queue 656 and therefore is deleted from buffered message queue 606.

X. "Zero Copy" Buffered Message Queues in Databases

The processing of enqueue requests by database processes requires that messages be transferred from the local memory associated with the enqueuing processes to the memory associated with the buffered message queue. Similarly, the processing of dequeue requests by database processes requires that messages be transferred from the memory associated with the buffered message queue to the memory associated with the dequeuing processes. Both of these scenarios involve message transfers between the memory associated with the process and the memory associated with the buffered message queue. These transfers may also involve converting the format of messages between process-specific formats and formats required by the database for the buffered message queue. Memory copy operations are generally computationally expensive to execute. The expense of making message copies is justified in unavoidable situations where the enqueuing and dequeuing processes are required to simultaneously read/update a private copy of the message. There are many situations, however, where this is not required and the expense is unjustified.

The processing of enqueue and dequeue requests from an external process may also require special processing of the message data between a format in which the data is stored in the local external memory and a format in which the data is stored in the database. For example, message data is sometimes linearized or "pickled" before being stored on disk and delinearized, "objectified" or "unpickled" when retrieved from disk.

According to one embodiment of the invention, for processes that execute within a database system, a "zero copy" access approach is used to enqueue and dequeue messages. This approach reduces the amount of overhead that is required to processes enqueue and dequeue requests.

Figure 8:
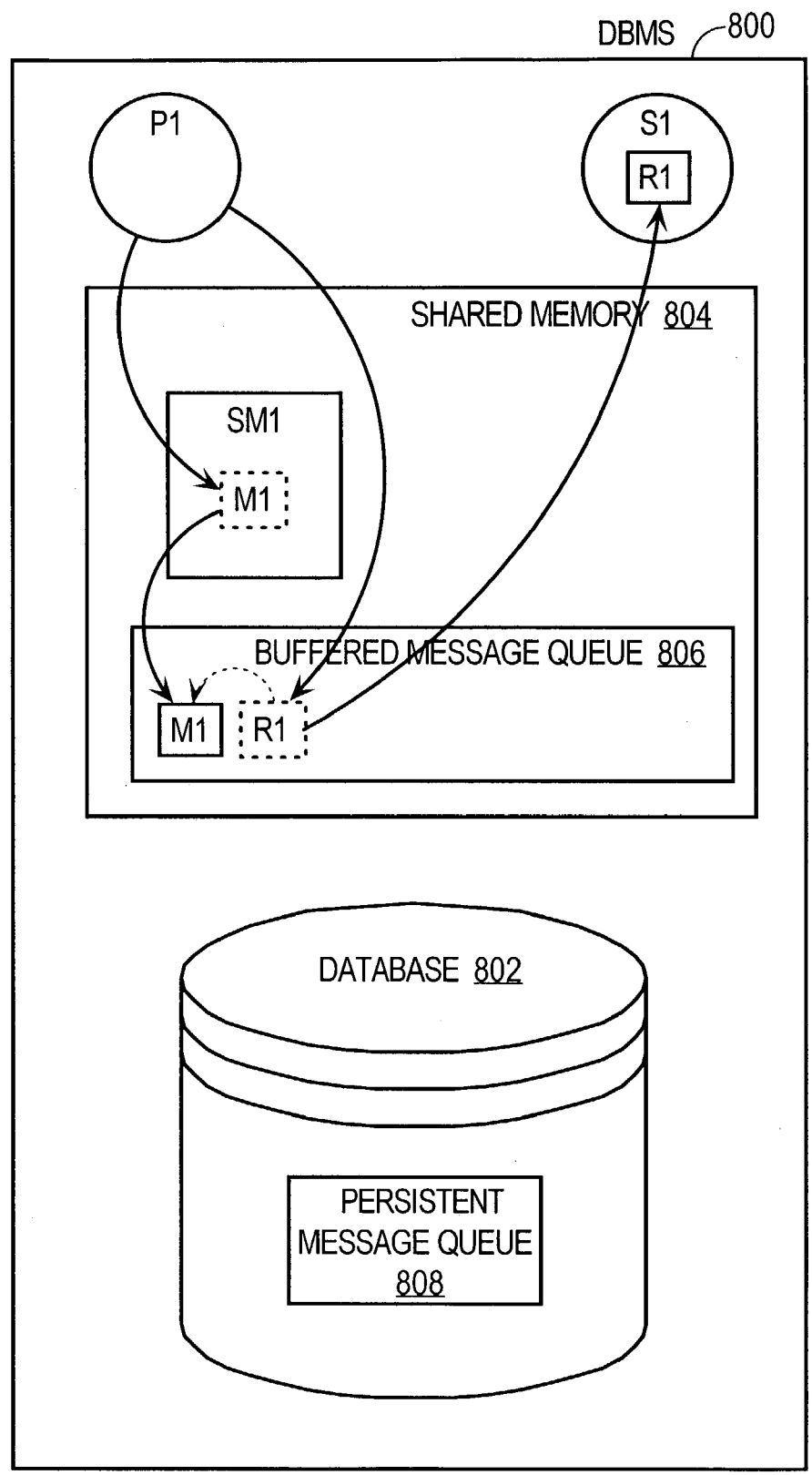
FIG. 8 is a block diagram that depicts a DBMS configured to provide "zero copy" access to a buffered message queue according to an embodiment of the invention.

FIG. 8 is a block diagram that depicts a DBMS 800 configured to provide "zero copy" access to queued messages according to an embodiment of the invention. DBMS 800 includes a database 802, a shared memory 804, a buffered message queue 806 disposed in shared memory 804 and a persistent message queue 808 stored on database 802. DMBS 800 also includes a publisher P1 and a subscriber S1 executing within DBMS 800.

Figure 9:
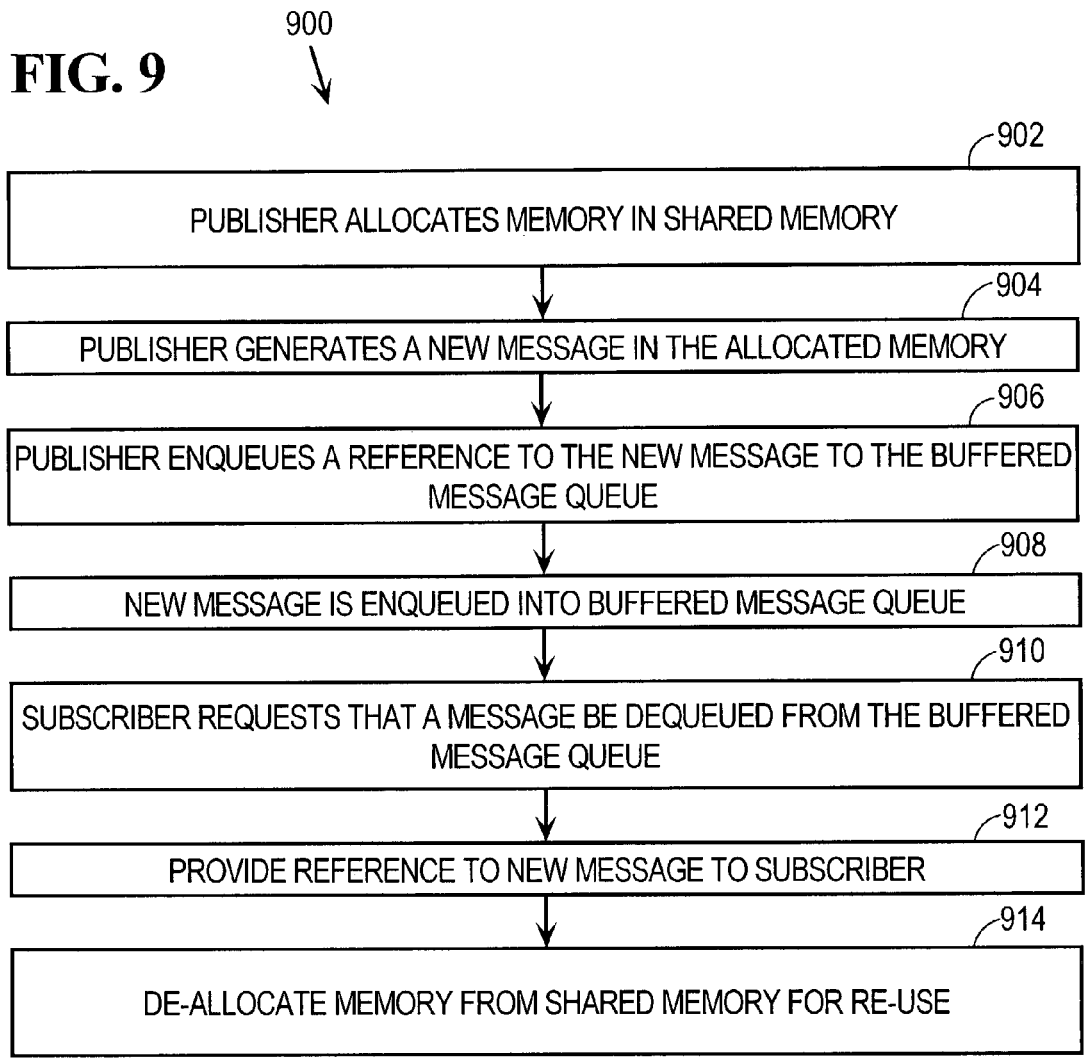
FIG. 9 is a flow diagram that depicts an approach for performing "zero copy" access to a buffered message queue in a database system according to an embodiment of the invention.

The enqueuing and dequeuing of messages from a buffered message queue using "zero copy" access is now described with reference to FIG. 8 and a flow diagram 900 of FIG. 9. In step 902, a publisher allocates a portion of a shared memory in which a buffered message queue is disposed. In the present example, publisher P1 allocates a portion SM1 of shared memory 804.

In step 904, the publisher process generates a new message in the allocated portion of the shared memory. In the present example, publisher P1 generates a new message M1 in portion SM1 of shared memory 804.

In step 906, the publisher enqueues a reference to the new message into the buffered message queue. In the present example, publisher P1 enqueues a reference R1 to the new message M1 into buffered message queue 806.

In step 908, the new message is enqueued into the buffered message queue. In the present example, the new message M1 is enqueued from portion SM1 of shared memory 804 into buffered message queue 806, which is also in shared memory 804.

In step 910, the subscriber requests that a message be dequeued from the buffered message queue. A determination is made whether a message in the buffered message queue satisfies the subscription data for the subscriber process. In the present example, subscriber S1 requests that a message be dequeueud from buffered message queue 806 and a determination is made whether message M1 satisfies the subscription data for subscriber S1. In the present example, it is presumed that message M1 satisfies the subscription data for subscriber S1.

In step 912, a reference to the new message in the buffered message queue is provided to the subscriber. In the present example, the reference R1 to the new message M1 is provided to subscriber S1. At this point, subscriber S1 may use the reference R1 to operate on the new message M1. Also, other subscribers may request that a message be dequeued from buffered message queue 806 and the reference R1 to the new message M1 may also be given to them.

In step 914, the allocated memory is de-allocated from the shared memory for re-use after all subscribers of the message have consumed the message. In the present example, the portion SM1 of shared memory 804 is de-allocated for re-use by other processes.

As should be apparent from the foregoing example, the "zero copy" access approach for enqueuing and dequeuing messages reduces the amount of overhead required to processes enqueue and dequeue requests by reducing the number of memory copy operations that are performed. Since portion SM1 and buffered message queue 806 are disposed in the same shared memory 804, expensive memory copies are not required to enqueue and dequeue messages. Furthermore, the overhead attributable to formatting message data into a format required by database 802 is avoided since messages are maintained in buffered message queue 806 in shared memory 804.

XI. Transactional Enqueue

In some situations, messages to be enqueued into a buffered message queue are associated with "atomic" transactions. One important characteristic of atomic transactions is that either all of the changes associated with the transaction are made or none of the changes associated with the transaction are made. This ensures that data changed by the transaction is always in a known state and provides certainty. This is particularly useful in implementations where changes made by a transaction are dependent upon each other, for example, in financial transactions.

According to one embodiment of the invention, an approach referred to as "transactional enqueue" is used to perform operations related to a buffered message queue based upon transactional association of messages. A work list is created for operations to be performed on messages related to the same transaction. The work list contains data that defines the operations to be performed on the messages related to the same transaction. The operations may be any type of operations and the invention is not limited to particular operations. The work list may also contain messages that are to be processed. When the transaction commits, then all of the operations specified by the work list are performed. If the transaction does not commit, then none of the operations specified by the work list are not performed. The transaction may not commit, for example, because of an error or the expiration of a timeout.

This approach provides for the enqueuing of messages associated with a transaction in an atomic manner. That is, either all of the operations are performed if the associated transaction commits, or none of the operations are performed if the associated transaction does not commit.

Figure 10A:
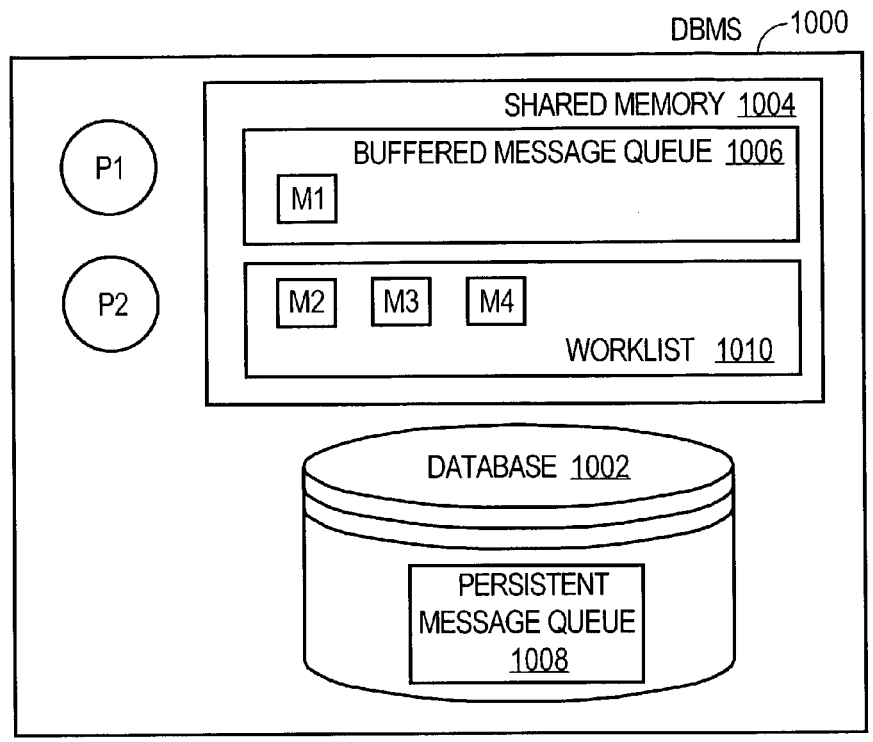
FIGS. 10A and 10B are block diagrams that depict a DBMS configured to perform transactional enqueue according to one embodiment of the invention.

FIG. 10A is a block diagram that depicts a DBMS 1000 configured to perform transactional enqueue according to one embodiment of the invention. DBMS 1000 includes a database 1002, a shared memory 1004, a buffered message queue 1006 disposed in shared memory 1004 and a persistent message queue 1008 stored on database 1002. DBMS 1000 also includes a work list 1008 disposed in shared memory 1004.

Figure 10B:
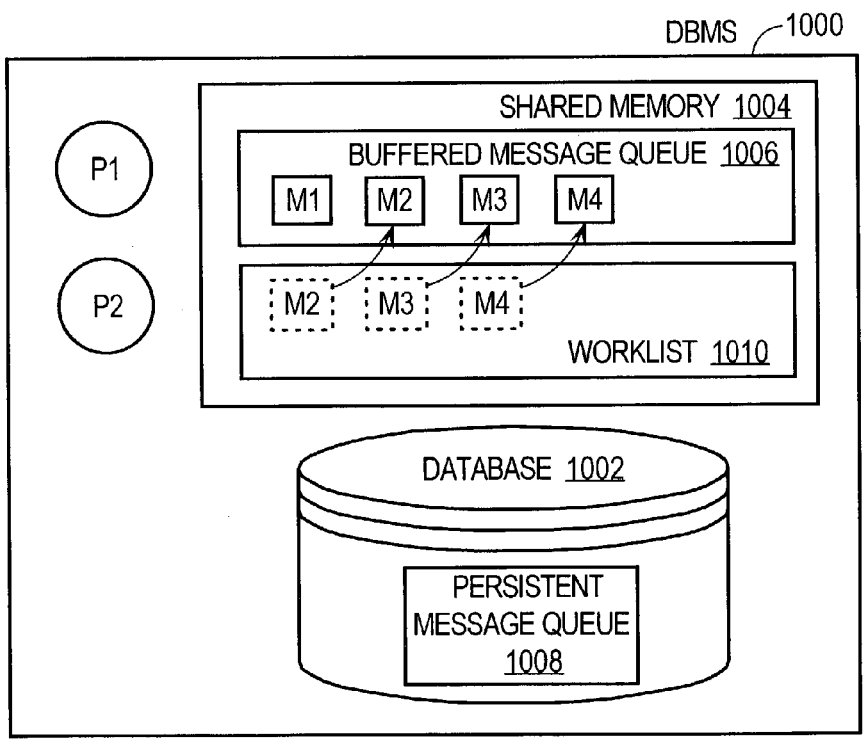
Figure 11:
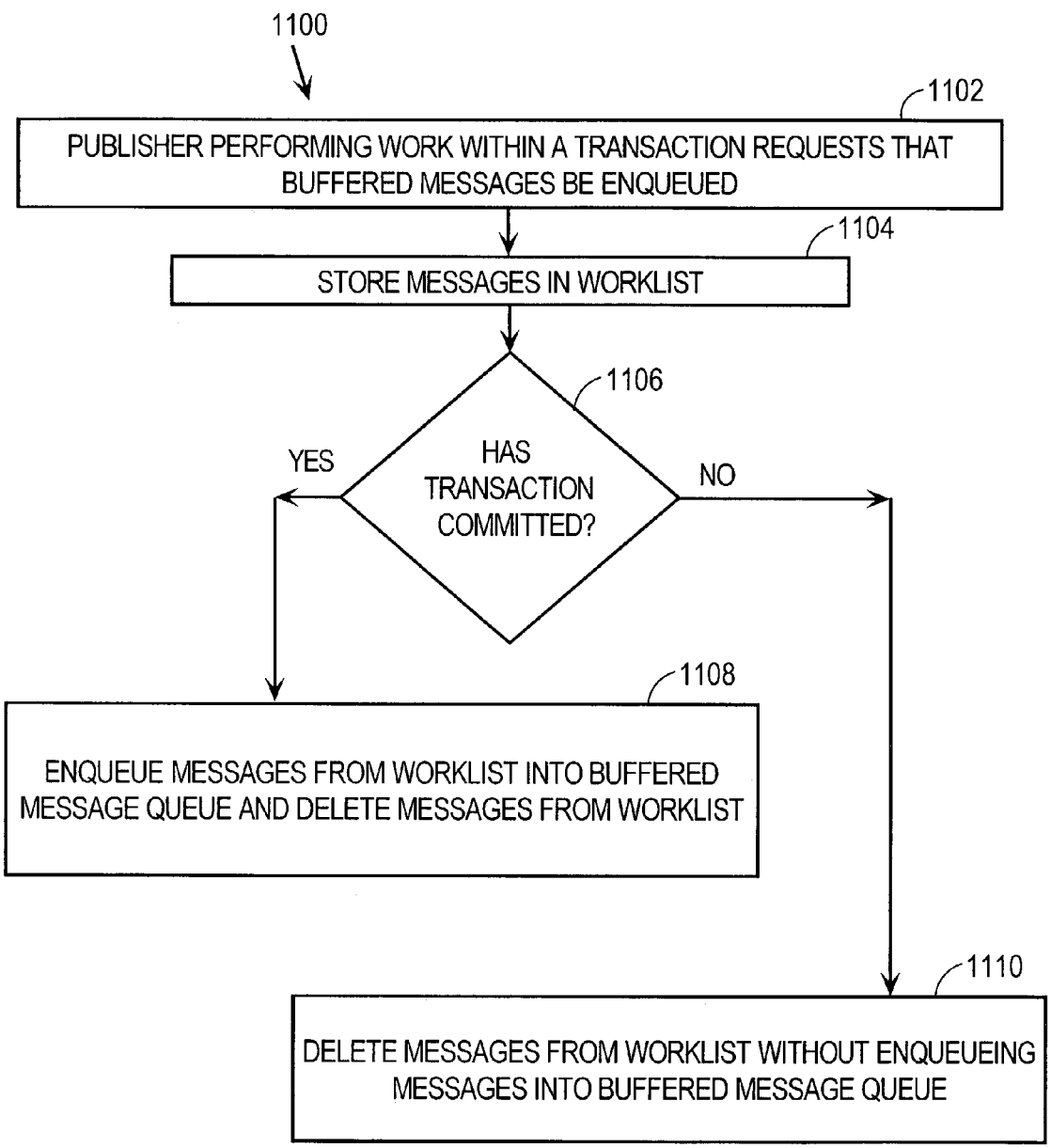
FIG. 11 is a flow diagram that depicts an approach for performing transactional enqueue according to one embodiment of the invention.

The transaction enqueue approach is now described with references to FIGS. 10A and 10B and a flow diagram 1100 of FIG. 11. Buffered message queue 1006 initially includes one enqueued message M1 and two local processes P1, P2 are executing in DBMS 1000.

In step 1102 a publisher process performing work within a transaction requests that new messages associated with the transaction be enqueued into a buffered message queue. In the present example, publisher P1 is performing work within a transaction and requests that messages M2–M4, that are associated with the transaction, be enqueued in buffered message queue 1006.

In step 1104, the new messages are stored into a work list. In the present example as depicted in FIG. 10A, messages M2–M4 are stored into work list 1008 instead of being enqueued into buffered message queue 1006. Work list 1008 may also contains data that specifies the operations to be performed on the new messages. For example, work list 1008 may contain data that specifies that messages M2–M4 are to be enqueued into buffered message queue 1006.

In step 1106, a determination is made whether the transaction has committed. If the transaction has committed, then in step 1108, the new messages are enqueued into the buffered message queue from the work list. In the present example, if the transaction has committed, then messages M2–M4 are enqueued from work list 1008 into buffered message queue 1006, as depicted in FIG. 10B.

If the transaction has not committed, for example because an error occurred or a timeout expired, then in step 1110, the new messages are deleted from the work list and are not enqueued into the buffered message queue. In the present example, messages M2–M4 are deleted from work list 1008 without being enqueued into buffered message queue 1006.

According to another embodiment of the invention, messages are stored in work list 1008 in a specified order and enqueued into buffered message queue 1006 in the same specified order. In the present example, messages M2–M4 are stored in work list 1008 in order, i.e., first message M2, then M3, then M4. If the transaction associated with messages M2–M4 commits, then message M2 is first enqueued into buffered message queue 1006, followed by message M3 and then message M4. This preserves an order that may be important for the transaction.

XII. Implementation Mechanisms, Alternatives & Extensions

The approach described herein for managing messages in database systems using buffered message queues is applicable to a variety of contexts and implementations and is not limited to a particular context or implementation.

Figure 12:
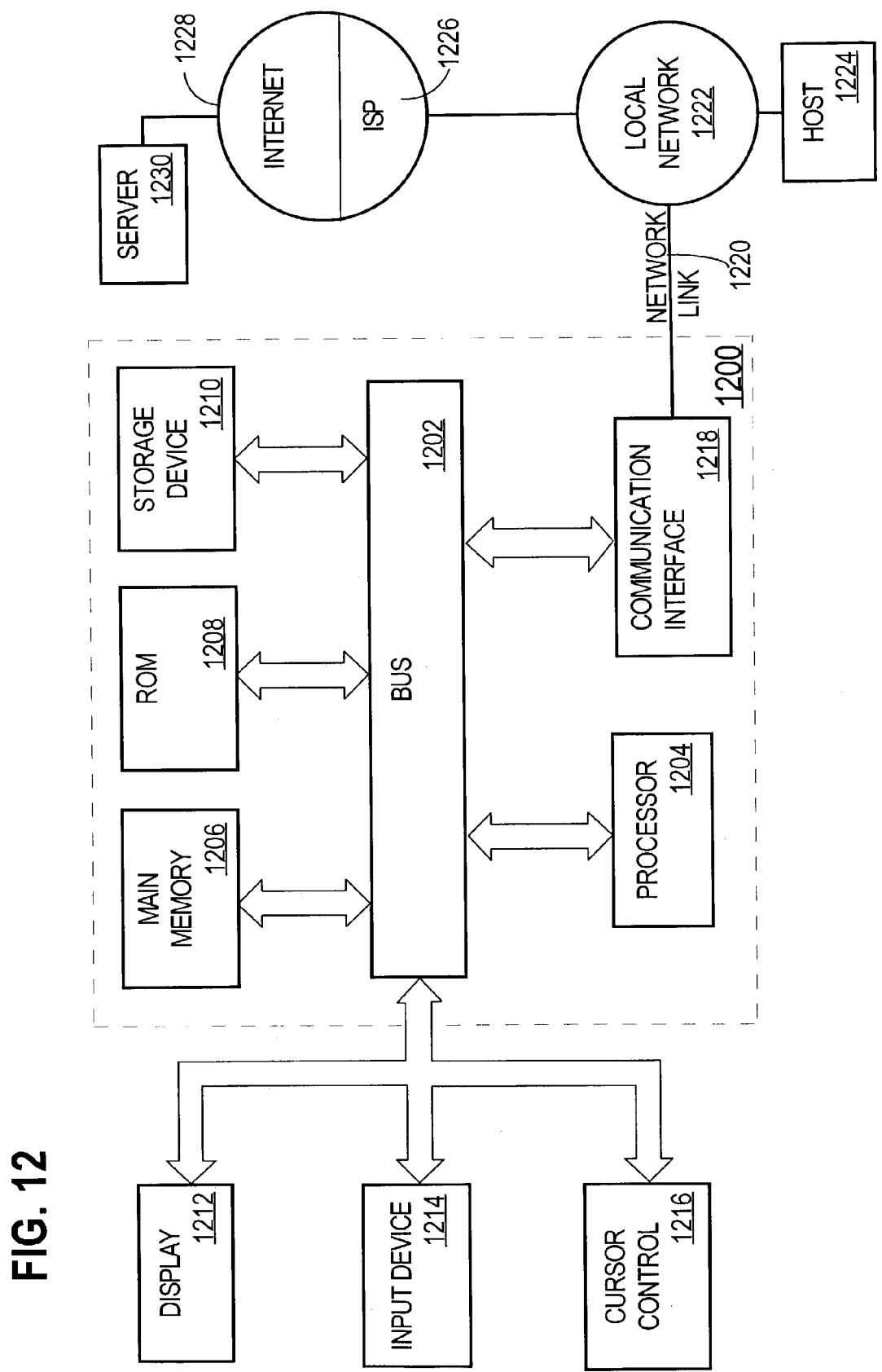
FIG. 12 is a block diagram that depicts a computer system on which embodiments of the present invention may be implemented.

FIG. 12 is a block diagram that illustrates a computer system 1200 upon which an embodiment of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

The invention is related to the use of computer system 1200 for managing messages in a database system using buffered message queues. According to one embodiment of the invention, the management of messages in a database system using buffered message queues is provided by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. One or more processors in a multi-processing arrangement may also be employed to execute the sequences of instructions contained in main memory 1206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1204 for execution. Such a medium may take many forms, including but not limited to, non-volatile media, volatile media, and transmission media. Non-volatile media includes, for example, optical or magnetic disks, such as storage device 1210. Volatile media includes dynamic memory, such as main memory 1206. Transmission media includes coaxial cables, copper wire and fiber optics, including the wires that comprise bus 1202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infrared transmitter to convert the data to an infrared signal. An infrared detector coupled to bus 1202 can receive the data carried in the infrared signal and place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the worldwide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of carrier waves transporting the information.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. In accordance with the invention, one such downloaded application provides for managing messages in a database system using buffered message queues as described herein.

The received code may be executed by processor 1204 as it is received, and/or stored in storage device 1210, or other non-volatile storage for later execution. In this manner, computer system 1200 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing messages in a database system, the method comprising the computer-implemented step of in response to a first message in a message queue created in a volatile memory of the database system being provided to all subscriber processes for which the first message satisfies the corresponding subscription data, generating a checkpoint value that indicates that the first message does not need to be restored to the message queue after a failure that causes the loss of the first message from the message queue; and storing the checkpoint value on a non-volatile storage.

2. The method as recited in claim 1, further comprising the computer-implemented step of after a failure that causes the loss of the first message from the message queue, retrieving the checkpoint value from the non-volatile storage, and providing the checkpoint value to a publisher process and requesting that the publisher process re-publish to the message queue any messages that the publisher process previously published to the message queue prior to the failure and after the first message was published to the message queue.

3. The method as recited in claim 1, further comprising the computer-implemented step of in response to a second message in the message queue being provided to all subscriber processes for which the second message satisfies the corresponding subscription data, updating the checkpoint value on the non-volatile storage to indicate that the second message does not need to be restored to the message queue after a failure that causes the loss of the second message from the message queue.

4. A method for managing messages in a database system, the method comprising the computer-implemented steps of:

generating and storing on a non-volatile storage in the database system, a first checkpoint value that identifies a first most recent message that was enqueued by a first publisher into a message queue implemented in a volatile memory of the database system and dequeued by all subscribers to the message queue for which the first most recent message satisfies corresponding subscription data; and generating and storing on the non-volatile storage a second checkpoint value that identifies a second most recent message that was enqueued by a second publisher into the message queue and dequeued by all subscribers to the message queue for which the second most recent message satisfies the corresponding subscription data.

5. The method as recited in claim 4, further comprising the computer-implemented step of after a failure,
retrieving the first checkpoint value from the non-volatile storage, and
providing the first checkpoint value to the first publisher so that the first publisher knows which messages the first publisher must be re-enqueue into the message queue.

6. The method as recited in claim 4, further comprising the computer-implemented step of in response to a third most recent message that was enqueued by the first publisher into the message queue being dequeued by all subscribers to the message queue for which the third most recent message satisfies the corresponding subscription data, updating the first checkpoint value on the non-volatile storage to identify the third most recent message.

7. A method for managing messages in a distributed database environment, the method comprising the computer-implemented steps of:
propagating one or more messages from a first message queue disposed in a volatile memory of a first database system to a second message queue disposed in a volatile memory of a second database system; and
receiving and storing in a non-volatile memory at the first database system, propagation acknowledgement data that indicates a most recent message from the one or more messages that have been processed for all subscribers to the second message queue of the second database system.

8. The method as recited in claim 7, further comprising the computer-implemented step of after a failure that causes the loss of any of the one or more messages in the second message queue of the second database system, re-propagating at least one message from the one or more messages stored in the first message queue in the first database system to the second message queue in the second database system, wherein the at least one message was enqueued in the first message queue of the first database system after the most recent message indicated by the propagation data.

9. The method as recited in claim 7, further comprising the computer-implemented steps of:
propagating one or more additional messages from the first message queue of the first database system to the second message queue of the second database system; and
receiving and storing in the non-volatile memory of the first database system second propagation acknowledgement data that indicates a most recent message from the one or more additional messages that have been processed for all subscribers to the second message queue of the second database system.

10. The method as recited in claim 7, further comprising the computer-implemented steps of at the first database system:
retrieving a checkpoint value that indicates a most recent message provided to all subscriber processes to the first message queue for which the first message satisfies the corresponding subscription data;
selecting as a selected message either the most recent message indicated by the checkpoint value or the message indicated by the propagation value based upon whether the most recent message indicated by the checkpoint value or the message indicated by the propagation value was stored earliest in the first message queue; and
deleting, from the first message queue of the first database system, one or more messages stored in the first message queue prior to the selected message.

11. A computer-readable storage medium for managing messages in a database system, the computer-readable medium carrying one or more sequences of instructions which, when executed by one or more processors, cause the one or more processors to perform the step in response to a first message in a message queue created in a volatile memory of the database system being provided to all subscriber processes for which the first message satisfies the corresponding subscription data,
generating a checkpoint value that indicates that the first message does not need to be restored to the message queue after a failure that causes the loss of the first message from the message queue; and
storing the checkpoint value on a non-volatile storage.

12. The computer-readable storage medium as recited in claim 11, further comprising one or more additional instructions which, when executed by the one or more processors, cause the one or more processors to perform the step of after a failure that causes the loss of the first message from the message queue,
retrieving the checkpoint value from the non-volatile storage, and
providing the checkpoint value to a publisher process and requesting that the publisher process re-publish to the message queue any messages that the publisher process previously published to the message queue prior to the failure and after the first message was published to the message queue.

13. The computer-readable storage medium as recited in claim 11, further comprising one or more additional instructions which, when executed by the one or more processors, cause the one or more processors to perform the step of in response to a second message in the message queue being provided to all subscriber processes for which the second message satisfies the corresponding subscription data, updating the checkpoint value on the non-volatile storage to indicate that the second message does not need to be restored to the message queue after a failure that causes the loss of the second message from the message queue.

14. A computer-readable storage medium for managing messages in a database system, the computer-readable medium carrying one or more sequences of instructions which, when executed by one or more processors, cause the one or more processors to perform the steps of:
generating and storing on a non-volatile storage in the database system, a first checkpoint value that identifies a first most recent message that was enqueued by a first publisher into a message queue implemented in a volatile memory of the database system and dequeued by all subscribers to the message queue for which the first most recent message satisfies corresponding subscription data; and
generating and storing on the non-volatile storage a second checkpoint value that identifies a second most recent message that was enqueued by a second publisher into the message queue and dequeued by all subscribers to the message queue for which the second most recent message satisfies the corresponding subscription data.

15. The computer-readable storage medium as recited in claim 14, further comprising one or more additional instructions which, when executed by the one or more processors, cause the one or more processors to perform the step of after a failure, retrieving the first checkpoint value from the non-volatile storage, and providing the first checkpoint value to the first publisher so that the first publisher knows which messages the first publisher must be re-enqueue into the message queue.

16. The computer-readable storage medium as recited in claim 14, further comprising one or more additional instructions which, when executed by the one or more processors, cause the one or more processors to perform the step of in response to a third most recent message that was enqueued by the first publisher into the message queue being dequeued by all subscribers to the message queue for which the third most recent message satisfies the corresponding subscription data, updating the first checkpoint value on the non-volatile storage to identify the third most recent message.

17. A computer-readable storage medium for managing messages in a distributed database environment, the computer-readable medium carrying one or more sequences of instructions which, when executed by one or more processors, cause the one or more processors to perform the steps of:

propagating one or more messages from a first message queue disposed in a volatile memory of a first database system to a second message queue disposed in a volatile memory of a second database system; and receiving and storing in a non-volatile memory at the first database system, propagation acknowledgement data that indicates a most recent message from the one or more messages that have been processed for all subscribers to the second message queue of the second database system.

18. The computer-readable storage medium as recited in claim 17, further comprising one or more additional instructions which, when executed by the one or more processors, cause the one or more processors to perform the step of after a failure that causes the loss of any of the one or more messages in the second message queue of the second database system, re-propagating at least one message from the one or more messages stored in the first message queue in the first database system to the second message queue in the second database system, wherein the at least one message was enqueued in the first message queue of the first database system after the most recent message indicated by the propagation data.

19. The computer-readable storage medium as recited in claim 17, further comprising one or more additional instructions which, when executed by the one or more processors, cause the one or more processors to perform the steps of:

propagating one or more additional messages from the first message queue of the first database system to the second message queue of the second database system; and receiving and storing in the non-volatile memory of the first database system second propagation acknowledgement data that indicates a most recent message from the one or more additional messages that have been processed for all subscribers to the second message queue of the second database system.

20. The computer-readable storage medium as recited in claim 17, further comprising one or more additional instructions which, when executed by the one or more processors, cause the one or more processors to perform the steps of at the first database system:

retrieving a checkpoint value that indicates a most recent message provided to all subscriber processes to the first message queue for which the first message satisfies the corresponding subscription data;

selecting as a selected message either the most recent message indicated by the checkpoint value or the message indicated by the propagation value based upon whether the most recent message indicated by the checkpoint value or the message indicated by the propagation value was stored earliest in the first message queue; and deleting, from the first message queue of the first database system, one or more messages stored in the first message queue prior to the selected message.

21. An apparatus for managing messages in a database system, the apparatus comprising a memory carrying one or more sequences of instructions which, when executed by one or more processors, cause the one or more processors to perform the step in response to a first message in a message queue created in a volatile memory of the database system being provided to all subscriber processes for which the first message satisfies the corresponding subscription data, generating a checkpoint value that indicates that the first message does not need to be restored to the message queue after a failure that causes the loss of the first message from the message queue; and storing the checkpoint value on a non-volatile storage.

22. The apparatus as recited in claim 21, wherein the memory further includes one or more additional instructions which, when executed by the one or more processors, cause the one or more processors to perform the step of after a failure that causes the loss of the first message from the message queue, retrieving the checkpoint value from the non-volatile storage, and providing the checkpoint value to a publisher process and requesting that the publisher process re-publish to the message queue any messages that the publisher process previously published to the message queue prior to the failure and after the first message was published to the message queue.

23. The apparatus as recited in claim 21, wherein the memory further includes one or more additional instructions which, when executed by the one or more processors, cause the one or more processors to perform the step of in response to a second message in the message queue being provided to all subscriber processes for which the second message satisfies the corresponding subscription data, updating the checkpoint value on the non-volatile storage to indicate that the second message does not need to be restored to the message queue after a failure that causes the loss of the second message from the message queue.

24. An apparatus for managing messages in a database system, the apparatus comprising a memory carrying one or more sequences of instructions which, when executed by one or more processors, cause the one or more processors to perform the steps of:

generating and storing on a non-volatile storage in the database system, a first checkpoint value that identifies a first most recent message that was enqueued by a first publisher into a message queue implemented in a volatile memory of the database system and dequeued by all subscribers to the message queue for which the first most recent message satisfies corresponding subscription data; and generating and storing on the non-volatile storage a second checkpoint value that identifies a second most recent message that was enqueued by a second publisher into the message queue and dequeued by all subscribers to the message queue for which the second most recent message satisfies the corresponding subscription data.

25. The apparatus as recited in claim 24, wherein the memory further includes one or more additional instructions which, when executed by the one or more processors, retrieving the first checkpoint value from the non-volatile storage, and providing the first checkpoint value to the first publisher so that the first publisher knows which messages the first publisher must be re-enqueue into the message queue.

26. The apparatus as recited in claim 24, wherein the memory further includes one or more additional instructions which, when executed by the one or more processors, cause the one or more processors to perform the step of in response to a third most recent message that was enqueued by the first publisher into the message queue being dequeued by all subscribers to the message queue for which the third most recent message satisfies the corresponding subscription data, updating the first checkpoint value on the non-volatile storage to identify the third most recent message.

27. An apparatus for managing messages in a distributed database environment, the apparatus comprising a memory carrying one or more sequences of instructions which, when executed by one or more processors, cause the one or more processors to perform the steps of:

propagating one or more messages from a first message queue disposed in a volatile memory of a first database system to a second message queue disposed in a volatile memory of a second database system; and receiving and storing in a non-volatile memory at the first database system, propagation acknowledgement data that indicates a most recent message from the one or more messages that have been processed for all subscribers to the second message queue of the second database system.

28. The apparatus as recited in claim 27, wherein the memory further includes one or more additional instructions which, when executed by the one or more processors, cause the one or more processors to perform the step of after a failure that causes the loss of any of the one or more messages in the second message queue of the second database system, re-propagating at least one message from the one or more messages stored in the first message queue in the first database system to the second message queue in the second database system, wherein the at least one message was enqueued in the first message queue of the first database system after the most recent message indicated by the propagation data.

29. The apparatus as recited in claim 27, wherein the memory further includes one or more additional instructions which, when executed by the one or more processors, cause the one or more processors to perform the steps of:

propagating one or more additional messages from the first message queue of the first database system to the second message queue of the second database system; and receiving and storing in the non-volatile memory of the first database system second propagation acknowledgement data that indicates a most recent message from the one or more additional messages that have been processed for all subscribers to the second message queue of the second database system.

30. The apparatus as recited in claim 27, wherein the memory further includes one or more additional instructions which, when executed by the one or more processors, cause the one or more processors to perform the steps of at the first database system:

retrieving a checkpoint value that indicates a most recent message provided to all subscriber processes to the first message queue for which the first message satisfies the corresponding subscription data;

selecting as a selected message either the most recent message indicated by the checkpoint value or the message indicated by the propagation value based upon whether the most recent message indicated by the checkpoint value or the message indicated by the propagation value was stored earliest in the first message queue; and deleting, from the first message queue of the first database system, one or more messages stored in the first message queue prior to the selected message.

* * * * *